(12) United States Patent
Smith et al.

(10) Patent No.: US 11,794,345 B2
(45) Date of Patent: Oct. 24, 2023

(54) UNIFIED ROBOTIC VEHICLE SYSTEMS AND METHODS OF CONTROL

(71) Applicant: Sarcos Corp., Salt Lake City, UT (US)

(72) Inventors: Fraser M. Smith, Salt Lake City, UT (US); Marc X. Olivier, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 100 days.

(21) Appl. No.: 17/139,868

(22) Filed: Dec. 31, 2020

(65) Prior Publication Data
US 2022/0212345 A1 Jul. 7, 2022

(51) Int. Cl.
*G06F 19/00* (2018.01)
*B25J 9/16* (2006.01)
(Continued)

(52) U.S. Cl.
CPC ............... *B25J 9/1682* (2013.01); *B25J 3/00* (2013.01); *B25J 5/005* (2013.01); *B25J 9/0006* (2013.01); *B25J 9/0084* (2013.01); *B25J 9/0087* (2013.01); *B25J 9/162* (2013.01); *B25J 9/1689* (2013.01); *B25J 13/02* (2013.01); *B25J 13/04* (2013.01);
(Continued)

(58) Field of Classification Search
CPC ... B25J 9/1682; B25J 3/00; B25J 5/005; B25J 9/0006; B25J 9/0084; B25J 9/0087; B25J 9/162; B25J 9/1689; B25J 13/02; B25J 13/04; B25J 13/082; B25J 13/088; B25J 3/04; G05B 2219/40048
See application file for complete search history.

(56) References Cited

U.S. PATENT DOCUMENTS

| 1,880,138 A | 9/1932 | Franz |
| 2,850,189 A | 9/1958 | Leroy |

(Continued)

FOREIGN PATENT DOCUMENTS

| CN | 103610524 A | 3/2014 |
| DE | 102004029513 B3 | 9/2005 |

(Continued)

OTHER PUBLICATIONS

IEEE proceedings of International Conference on robotics and biometrics, published 2006, title "Design and realization of a novel reconfigurable robot with serial and parallel mechanisms" by ("Wei") (Year: 2006).*

(Continued)

*Primary Examiner* — Abby Y Lin
*Assistant Examiner* — Sohana Tanju Khayer

(57) ABSTRACT

A robotic system comprising a master robotic system, and a first robotic system comprising a first mobile platform operable to move about a surface, and comprising a first manipulator. The robotic system can comprise a second robotic system comprising a second mobile platform operable to move about the surface, and comprising a second manipulator. A control module can be associated with the master robotic system and the first and second robotic systems, and can be operable in a paired control mode to facilitate paired control of the first and second robotic systems to move about the ground surface, and operable in an unpaired control mode to facilitate non-paired control of a selected one of the first or second robotic systems.

49 Claims, 16 Drawing Sheets

(51) Int. Cl.
*B25J 3/00* (2006.01)
*B25J 5/00* (2006.01)
*B25J 9/00* (2006.01)
*B25J 13/02* (2006.01)
*B25J 13/04* (2006.01)
*B25J 13/08* (2006.01)
*B25J 3/04* (2006.01)

(52) U.S. Cl.
CPC ........... *B25J 13/082* (2013.01); *B25J 13/088* (2013.01); *B25J 3/04* (2013.01); *G05B 2219/40048* (2013.01)

(56) References Cited

U.S. PATENT DOCUMENTS

| | | | |
|---|---|---|---|
| 2,981,198 A | 4/1961 | Nettel | |
| 3,171,549 A | 3/1965 | Orloff | |
| 3,280,991 A | 10/1966 | Melton et al. | |
| 3,306,646 A | 2/1967 | Flora, Jr. | |
| 3,358,678 A | 12/1967 | Kulstar | |
| 3,449,008 A | 6/1969 | Colechia | |
| 3,449,769 A | 6/1969 | Mizen | |
| 3,535,711 A | 10/1970 | Fick | |
| 3,606,048 A | 9/1971 | Long | |
| 3,759,563 A | 9/1973 | Kitamura | |
| 4,046,262 A | 9/1977 | Vykukal et al. | |
| 4,179,233 A | 12/1979 | Bromell et al. | |
| 4,200,596 A | 4/1980 | Iiyama et al. | |
| 4,251,791 A | 2/1981 | Yanagisawa et al. | |
| 4,297,073 A | 10/1981 | Schmid et al. | |
| 4,398,110 A | 8/1983 | Flinchbaugh et al. | |
| 4,483,407 A | 11/1984 | Iwamoto et al. | |
| 4,567,417 A | 1/1986 | Francois et al. | |
| 4,575,297 A | 3/1986 | Richter | |
| 4,591,944 A | 5/1986 | Gravel | |
| 4,603,896 A | 8/1986 | Vasseur et al. | |
| 4,661,032 A | 4/1987 | Arai | |
| 4,666,357 A | 5/1987 | Babbi | |
| 4,723,353 A | 2/1988 | Monforte | |
| 4,762,455 A | 8/1988 | Coughlan et al. | |
| 4,768,143 A | 8/1988 | Lane et al. | |
| 4,853,874 A | 8/1989 | Iwamoto et al. | |
| 4,883,400 A | 11/1989 | Kuban et al. | |
| 4,884,720 A | 12/1989 | Whigham et al. | |
| 4,915,437 A | 4/1990 | Cherry | |
| 4,921,292 A | 5/1990 | Harwell et al. | |
| 4,997,095 A | 3/1991 | Jones et al. | |
| 5,004,391 A | 4/1991 | Burdea | |
| 5,038,089 A | 8/1991 | Szakaly | |
| 5,072,361 A | 12/1991 | Davis et al. | |
| 5,101,472 A | 3/1992 | Repperger | |
| 5,105,367 A | 4/1992 | Tsuchihashi et al. | |
| 5,117,814 A | 6/1992 | Luttrell et al. | |
| 5,120,186 A | 6/1992 | Jorgenson | |
| 5,144,943 A | 9/1992 | Luttrell et al. | |
| 5,172,951 A | 12/1992 | Jacobsen et al. | |
| 5,200,674 A | 4/1993 | Fujimoto et al. | |
| 5,239,246 A | 8/1993 | Kim | |
| 5,282,460 A | 2/1994 | Boldt | |
| 5,328,224 A | 7/1994 | Jacobsen et al. | |
| 5,336,982 A | 8/1994 | Backes | |
| 5,389,849 A | 2/1995 | Asano et al. | |
| 5,399,951 A | 3/1995 | Lavallee et al. | |
| 5,516,249 A | 5/1996 | Brimhall | |
| 5,577,417 A | 11/1996 | Fournier | |
| 5,588,688 A | 12/1996 | Jacobsen et al. | |
| 5,664,636 A | 9/1997 | Ikuma et al. | |
| 5,784,542 A | 7/1998 | Ohm et al. | |
| 5,785,505 A | 7/1998 | Price | |
| 5,797,615 A | 8/1998 | Murray | |
| 5,845,540 A | 12/1998 | Rosheim | |
| 5,865,770 A | 2/1999 | Schectman | |
| 5,898,599 A | 4/1999 | Massie et al. | |
| 5,912,658 A | 6/1999 | Bergamasco et al. | |
| 5,949,686 A | 9/1999 | Yoshinada et al. | |
| 5,961,476 A | 10/1999 | Betto et al. | |
| 5,967,580 A | 10/1999 | Rosheim | |
| 5,984,618 A | 11/1999 | Deneve et al. | |
| 5,994,864 A | 11/1999 | Inoue et al. | |
| 6,016,385 A | 1/2000 | Yee et al. | |
| 6,170,162 B1 | 1/2001 | Jacobsen et al. | |
| 6,233,504 B1 | 5/2001 | Das et al. | |
| 6,272,924 B1 | 8/2001 | Jansen | |
| 6,301,526 B1 | 10/2001 | Kim et al. | |
| 6,338,605 B1 | 1/2002 | Halverson et al. | |
| 6,340,065 B1 | 1/2002 | Harris | |
| 6,360,166 B1 | 3/2002 | Alster | |
| 6,394,731 B1 | 5/2002 | Konosu et al. | |
| 6,425,865 B1 | 7/2002 | Salcudean et al. | |
| 6,430,473 B1 | 8/2002 | Lee et al. | |
| 6,435,794 B1 | 8/2002 | Springer | |
| 6,507,163 B1 | 1/2003 | Allen | |
| 6,508,058 B1 | 1/2003 | Seaverson | |
| 6,554,342 B1 | 4/2003 | Burnett | |
| 6,641,371 B2 | 11/2003 | Graziani et al. | |
| 6,659,703 B1 | 12/2003 | Kirkley | |
| 6,659,939 B2 | 12/2003 | Moll et al. | |
| 6,663,154 B2 | 12/2003 | Pancheri | |
| 7,168,748 B2 | 1/2007 | Townsend et al. | |
| 7,396,057 B2 | 7/2008 | Ye et al. | |
| 7,405,531 B2 | 7/2008 | Khatib et al. | |
| 7,409,882 B2 | 8/2008 | Massimo et al. | |
| 7,410,338 B2 | 8/2008 | Schiele et al. | |
| 7,509,905 B2 | 3/2009 | Jacobsen et al. | |
| 7,628,766 B1 | 12/2009 | Kazerooni et al. | |
| 7,783,384 B2 | 8/2010 | Kraft | |
| 7,841,822 B2 | 11/2010 | Tygard | |
| 7,862,522 B1 | 1/2011 | Barclay et al. | |
| 7,862,524 B2 | 1/2011 | Carignan et al. | |
| 7,883,546 B2 | 2/2011 | Kazerooni et al. | |
| 7,947,004 B2 | 5/2011 | Kazerooni et al. | |
| 7,965,006 B2 | 6/2011 | Kang et al. | |
| 8,024,071 B2 | 9/2011 | Komatsu et al. | |
| 8,051,764 B2 | 11/2011 | Jacobsen et al. | |
| 8,132,835 B2 | 3/2012 | Ban et al. | |
| 8,151,401 B2 | 4/2012 | Cheyne | |
| 8,245,728 B2 | 8/2012 | Jacobsen et al. | |
| 8,295,975 B2 | 10/2012 | Arimatsu et al. | |
| 8,375,982 B2 | 2/2013 | Gray, Jr. | |
| 8,435,309 B2 | 5/2013 | Gilbert et al. | |
| 8,452,447 B2 | 5/2013 | Nixon | |
| 8,473,101 B2 | 6/2013 | Summer | |
| 8,511,192 B2 | 8/2013 | Hirtt et al. | |
| 8,516,918 B2 | 8/2013 | Jacobsen et al. | |
| 8,529,582 B2 | 9/2013 | Devengenzo et al. | |
| 8,560,118 B2 | 10/2013 | Greer et al. | |
| 8,640,723 B2 | 2/2014 | Jacobsen et al. | |
| 8,667,643 B2 | 3/2014 | Simonelli et al. | |
| 8,794,262 B2 | 8/2014 | Jacobsen et al. | |
| 8,821,338 B2 | 9/2014 | Thorson | |
| 8,849,457 B2 | 9/2014 | Jacobsen et al. | |
| 8,870,967 B2 | 10/2014 | Herr et al. | |
| 8,881,616 B2 | 11/2014 | Dize et al. | |
| 8,892,258 B2 | 11/2014 | Jacobsen et al. | |
| 8,942,846 B2 | 1/2015 | Jacobsen et al. | |
| 8,974,169 B2 | 3/2015 | Mizner | |
| 8,977,388 B2 | 3/2015 | Jacobsen et al. | |
| 8,977,398 B2 | 3/2015 | Jacobsen et al. | |
| 9,295,604 B2 | 3/2016 | Zoss et al. | |
| 9,314,921 B2 | 4/2016 | Jacobsen et al. | |
| 9,329,587 B2 | 5/2016 | Fudaba et al. | |
| 9,333,097 B2 | 5/2016 | Herr et al. | |
| 9,533,411 B2 | 1/2017 | Jacobsen et al. | |
| 9,616,580 B2 | 4/2017 | Smith et al. | |
| 9,727,076 B2 | 8/2017 | Smith et al. | |
| 9,789,603 B2 | 10/2017 | Jacobsen et al. | |
| 9,999,476 B2 | 6/2018 | Griffiths et al. | |
| 10,192,195 B1 * | 1/2019 | Brazeau | B25J 9/1661 |
| 10,406,676 B2 | 9/2019 | Smith et al. | |
| 10,478,917 B2 * | 11/2019 | Legault | B23K 26/044 |
| 10,512,583 B2 | 12/2019 | Smith | |
| 10,533,542 B2 | 1/2020 | Smith et al. | |
| 10,646,993 B1 * | 5/2020 | Wiley | B25J 9/16 |

(56) References Cited

U.S. PATENT DOCUMENTS

| | | | |
|---|---|---|---|
| 10,980,605 B2* | 4/2021 | Hashimoto | B25J 9/1697 |
| 2001/0033146 A1 | 10/2001 | Kato et al. | |
| 2001/0043847 A1 | 11/2001 | Kramer | |
| 2002/0075233 A1 | 6/2002 | White et al. | |
| 2002/0094919 A1 | 7/2002 | Rennex et al. | |
| 2003/0005896 A1 | 1/2003 | Jacobsen et al. | |
| 2003/0049098 A1 | 3/2003 | Parker et al. | |
| 2003/0146720 A1 | 8/2003 | Riwan et al. | |
| 2003/0152452 A1 | 8/2003 | Hodgson | |
| 2003/0223844 A1 | 12/2003 | Schiele et al. | |
| 2004/0004362 A1 | 1/2004 | Love | |
| 2004/0037681 A1 | 2/2004 | Marcotte | |
| 2004/0102723 A1 | 5/2004 | Horst | |
| 2004/0106881 A1 | 6/2004 | McBean et al. | |
| 2004/0116836 A1 | 6/2004 | Kawai et al. | |
| 2004/0246769 A1 | 12/2004 | Ido | |
| 2004/0250644 A1 | 12/2004 | Gosselin et al. | |
| 2005/0059908 A1 | 3/2005 | Bogert | |
| 2005/0099386 A1 | 5/2005 | Kukita | |
| 2005/0159850 A1 | 7/2005 | Melman | |
| 2005/0166413 A1 | 8/2005 | Crampton | |
| 2005/0193451 A1 | 9/2005 | Quistgaard et al. | |
| 2005/0251110 A1 | 11/2005 | Nixon | |
| 2006/0052732 A1 | 3/2006 | Shimada et al. | |
| 2006/0064047 A1 | 3/2006 | Shimada et al. | |
| 2006/0069449 A1 | 3/2006 | Bisbee, III et al. | |
| 2006/0130594 A1 | 6/2006 | Ikeuchi | |
| 2006/0149419 A1 | 7/2006 | Ogawa et al. | |
| 2006/0184275 A1 | 8/2006 | Hosokawa et al. | |
| 2006/0197049 A1 | 9/2006 | Hamada et al. | |
| 2006/0245897 A1 | 11/2006 | Hariki et al. | |
| 2006/0249315 A1 | 11/2006 | Herr et al. | |
| 2007/0052496 A1 | 3/2007 | Niemeyer et al. | |
| 2007/0054777 A1 | 3/2007 | Kawai et al. | |
| 2007/0105070 A1 | 5/2007 | Trawick | |
| 2007/0123997 A1 | 5/2007 | Herr et al. | |
| 2007/0129653 A1 | 6/2007 | Sugar et al. | |
| 2008/0156363 A1 | 7/2008 | Ikeuchi et al. | |
| 2008/0269027 A1 | 10/2008 | Chen | |
| 2008/0271942 A1 | 11/2008 | Yamashita et al. | |
| 2008/0281468 A1 | 11/2008 | Jacobsen et al. | |
| 2009/0036815 A1 | 2/2009 | Ido | |
| 2009/0038258 A1 | 2/2009 | Pivac et al. | |
| 2009/0039579 A1 | 2/2009 | Clifford et al. | |
| 2009/0199883 A1 | 8/2009 | Hiki | |
| 2009/0210093 A1 | 8/2009 | Jacobsen et al. | |
| 2009/0294218 A1 | 12/2009 | Archer et al. | |
| 2009/0294238 A1 | 12/2009 | Gilmore | |
| 2010/0050947 A1 | 3/2010 | Kortekaas | |
| 2010/0089855 A1 | 4/2010 | Kjolseth | |
| 2010/0094185 A1 | 4/2010 | Amundson et al. | |
| 2010/0152630 A1 | 6/2010 | Matsuoka et al. | |
| 2010/0198402 A1 | 8/2010 | Greer et al. | |
| 2010/0241242 A1 | 9/2010 | Herr et al. | |
| 2010/0295497 A1 | 11/2010 | Takamatsu | |
| 2011/0010012 A1 | 1/2011 | Murayama et al. | |
| 2011/0040216 A1 | 2/2011 | Herr et al. | |
| 2011/0046781 A1* | 2/2011 | Summer | B25J 9/162 |
| | | | 700/248 |
| 2011/0066088 A1 | 3/2011 | Little et al. | |
| 2011/0071677 A1 | 3/2011 | Stillman | |
| 2011/0219899 A1 | 9/2011 | Dize et al. | |
| 2011/0264230 A1 | 10/2011 | Herr et al. | |
| 2012/0000891 A1 | 1/2012 | Nakanishi et al. | |
| 2012/0060322 A1 | 3/2012 | Simonelli et al. | |
| 2012/0065902 A1 | 3/2012 | Nakajima | |
| 2012/0073930 A1 | 3/2012 | Lansberry et al. | |
| 2012/0137667 A1 | 6/2012 | Jacobsen et al. | |
| 2012/0179075 A1 | 7/2012 | Perry et al. | |
| 2012/0191245 A1 | 7/2012 | Fudaba et al. | |
| 2012/0216671 A1 | 8/2012 | Gammon | |
| 2012/0237319 A1 | 9/2012 | Jacobsen et al. | |
| 2012/0259429 A1 | 10/2012 | Han et al. | |
| 2012/0277901 A1 | 11/2012 | Jacobsen et al. | |
| 2012/0277911 A1 | 11/2012 | Jacobsen et al. | |
| 2012/0277915 A1 | 11/2012 | Jacobsen et al. | |
| 2012/0328395 A1 | 12/2012 | Jacobsen et al. | |
| 2013/0011220 A1 | 1/2013 | Jacobsen et al. | |
| 2013/0013108 A1 | 1/2013 | Jacobsen et al. | |
| 2013/0023803 A1 | 1/2013 | Hsu et al. | |
| 2013/0057001 A1 | 3/2013 | Tsai | |
| 2013/0090580 A1 | 4/2013 | Hong et al. | |
| 2013/0090880 A1* | 4/2013 | Sato | B25J 13/085 |
| | | | 702/98 |
| 2013/0192406 A1 | 8/2013 | Godowski | |
| 2013/0226048 A1 | 8/2013 | Unluhisarcikili et al. | |
| 2013/0253385 A1 | 9/2013 | Goffer et al. | |
| 2013/0296746 A1 | 11/2013 | Herr et al. | |
| 2013/0331744 A1 | 12/2013 | Kamon | |
| 2013/0333368 A1 | 12/2013 | Durfee et al. | |
| 2014/0005831 A1 | 1/2014 | Naderer et al. | |
| 2014/0100492 A1 | 4/2014 | Nagasaka | |
| 2014/0190289 A1 | 7/2014 | Zhu | |
| 2014/0195052 A1 | 7/2014 | Tsusaka et al. | |
| 2015/0073595 A1 | 3/2015 | Fudaba et al. | |
| 2015/0073596 A1 | 3/2015 | Fudaba et al. | |
| 2015/0142172 A1* | 5/2015 | Jacobsen | B25J 13/025 |
| | | | 700/257 |
| 2015/0173929 A1 | 6/2015 | Kazerooni et al. | |
| 2015/0209214 A1 | 7/2015 | Herr et al. | |
| 2015/0278263 A1 | 10/2015 | Bowles et al. | |
| 2015/0321342 A1 | 11/2015 | Smith et al. | |
| 2016/0129596 A1* | 5/2016 | Pfaff | B25J 9/1682 |
| | | | 700/255 |
| 2016/0153508 A1 | 6/2016 | Battlogg | |
| 2016/0207198 A1* | 7/2016 | Willför | B25J 9/1676 |
| 2016/0331572 A1 | 11/2016 | Popovic et al. | |
| 2016/0332302 A1 | 11/2016 | Bingham et al. | |
| 2016/0332305 A1 | 11/2016 | Gonzalez et al. | |
| 2017/0106541 A1* | 4/2017 | Naitou | B25J 9/1682 |
| 2018/0133905 A1 | 5/2018 | Smith et al. | |
| 2018/0193999 A1 | 7/2018 | Jacobsen et al. | |
| 2018/0290309 A1 | 10/2018 | Becker et al. | |
| 2018/0298976 A1 | 10/2018 | Battlogg | |
| 2018/0326580 A1* | 11/2018 | Wessén | G05B 19/41885 |
| 2019/0176320 A1* | 6/2019 | Smith | F16D 55/00 |
| 2019/0184576 A1 | 6/2019 | Smith et al. | |
| 2019/0299409 A1* | 10/2019 | Hazan | B25J 9/1666 |
| 2020/0230803 A1* | 7/2020 | Yamashita | B25J 18/00 |
| 2020/0367977 A1* | 11/2020 | Liu | B25J 9/1676 |
| 2020/0376659 A1* | 12/2020 | Diankov | B25J 13/08 |
| 2021/0053230 A1* | 2/2021 | Mizoguchi | B25J 9/1697 |
| 2021/0069889 A1 | 3/2021 | Jacobsen et al. | |
| 2021/0178604 A1* | 6/2021 | Saunders | G01L 5/00 |
| 2021/0260757 A1* | 8/2021 | Nielsen | B25J 9/163 |
| 2021/0260775 A1* | 8/2021 | Mizoguchi | B25J 15/0683 |
| 2022/0410366 A1 | 12/2022 | Smith et al. | |
| 2022/0410367 A1 | 12/2022 | Smith et al. | |

FOREIGN PATENT DOCUMENTS

| | | |
|---|---|---|
| DE | 102010029088 A1 | 11/2011 |
| EP | 0039578 A1 | 11/1981 |
| EP | 0704780 A1 | 4/1996 |
| EP | 0616275 A3 | 9/1998 |
| EP | 1037264 A2 | 9/2000 |
| EP | 1258324 A2 | 11/2002 |
| EP | 1442846 A1 | 8/2004 |
| EP | 1721593 A1 | 11/2006 |
| EP | 2198810 A1 | 6/2010 |
| EP | 2942162 A2 | 11/2015 |
| EP | 2168548 B1 | 10/2016 |
| FR | 2615778 A2 | 12/1988 |
| FR | 2651220 A1 | 3/1991 |
| GB | 686237 A | 1/1953 |
| GB | 2278041 A | 11/1994 |
| JP | S34-015764 | 10/1959 |
| JP | S36-005228 | 5/1961 |
| JP | S44-000603 | 1/1969 |
| JP | S50-009803 | 1/1975 |
| JP | S50-006043 | 3/1975 |
| JP | S52-013252 A | 2/1977 |
| JP | S52-134985 A | 11/1977 |
| JP | S56-140510 A | 11/1981 |

(56) References Cited

FOREIGN PATENT DOCUMENTS

| | | |
|---|---|---|
| JP | S58-113586 A | 7/1983 |
| JP | S60-177883 U | 11/1985 |
| JP | S62-193784 A | 8/1987 |
| JP | S62-199375 A | 9/1987 |
| JP | S62-200600 A | 9/1987 |
| JP | H01-205985 A | 8/1989 |
| JP | H01-295772 A | 11/1989 |
| JP | H02-51083 U | 4/1990 |
| JP | H02-205494 A | 8/1990 |
| JP | H02-219377 A | 8/1990 |
| JP | H03-85398 U | 8/1991 |
| JP | H04-44296 U | 4/1992 |
| JP | H05-004177 A | 1/1993 |
| JP | H06-213266 A | 8/1994 |
| JP | H07-001366 A | 1/1995 |
| JP | H07-5129 Y2 | 2/1995 |
| JP | H07-060679 A | 3/1995 |
| JP | H07-112377 A | 5/1995 |
| JP | H07-031291 U | 6/1995 |
| JP | H07-246578 A | 9/1995 |
| JP | H08-126984 A | 5/1996 |
| JP | H08-253950 A | 10/1996 |
| JP | H09-11176 A | 1/1997 |
| JP | H09-328783 A | 12/1997 |
| JP | H1156931 | 3/1999 |
| JP | H11-130279 A | 5/1999 |
| JP | 2002-161547 A | 6/2002 |
| JP | 2003-103480 A | 4/2003 |
| JP | 2003-159683 A | 6/2003 |
| JP | 2004-105261 A | 4/2004 |
| JP | 2005-118938 A | 5/2005 |
| JP | 2005-237504 A | 9/2005 |
| JP | 2005-334999 A | 12/2005 |
| JP | 2006-016916 A | 1/2006 |
| JP | 2006-028953 A | 2/2006 |
| JP | 2006-051558 A | 2/2006 |
| JP | 2006-167223 A | 6/2006 |
| JP | 3909770 B2 | 4/2007 |
| JP | 2007-130234 A | 5/2007 |
| JP | 2007-252514 A | 10/2007 |
| JP | 2007-307216 A | 11/2007 |
| JP | 2008-143449 A | 6/2008 |
| JP | 2008-207262 A | 9/2008 |
| JP | 2009-023828 A | 2/2009 |
| JP | 2009-167673 A | 7/2009 |
| JP | 2009-178253 A | 8/2009 |
| JP | 2009-219650 A | 10/2009 |
| JP | 2009-240488 A | 10/2009 |
| JP | 2009-268839 A | 11/2009 |
| JP | 2010-058616 A | 3/2010 |
| JP | 2010-083434 A | 4/2010 |
| JP | 2010-098130 A | 4/2010 |
| JP | 2010-110381 A | 5/2010 |
| JP | 2010-110465 A | 5/2010 |
| JP | 2010-142351 A | 7/2010 |
| JP | 2011-193899 A | 10/2011 |
| JP | 2012-501739 A | 1/2012 |
| JP | 2012-125279 A | 7/2012 |
| JP | 2013-022091 A | 2/2013 |
| JP | 2013-090693 A | 5/2013 |
| JP | 2013-142445 A | 7/2013 |
| JP | 5267730 | 8/2013 |
| JP | 2013-248699 A | 12/2013 |
| JP | 2014-054253 A | 3/2014 |
| JP | 2014-073222 A | 4/2014 |
| JP | 2015-212010 A | 11/2015 |
| JP | 2016-539017 A | 12/2016 |
| KR | 2007-0057209 A | 6/2007 |
| KR | 2012-0105194 A | 9/2012 |
| KR | 10-1219795 B1 | 1/2013 |
| KR | 2013-0001409 A | 1/2013 |
| KR | 2013-0045777 A | 5/2013 |
| KR | 2019-0097824 A | 8/2019 |
| WO | WO 03/002309 A1 | 1/2003 |
| WO | WO 03/081762 A1 | 10/2003 |
| WO | WO 2007/144629 A2 | 12/2007 |
| WO | WO 2009/143377 A2 | 11/2009 |
| WO | WO 2010/025409 A1 | 3/2010 |
| WO | WO 2010/027968 A2 | 3/2010 |
| WO | WO 2012/042471 A1 | 4/2012 |
| WO | WO 2012/149402 A2 | 11/2012 |
| WO | WO 2012/149446 A2 | 11/2012 |
| WO | WO 2012/162229 A1 | 11/2012 |
| WO | WO 2017/148499 A1 | 9/2017 |
| WO | WO 2018/118004 A1 | 6/2018 |
| WO | WO 2018/211869 A1 | 11/2018 |
| WO | WO 2018/215705 A1 | 11/2018 |

OTHER PUBLICATIONS

Aghili et al., Sensing the torque in a robot's joints, www.memagazine.org/backissues/september98/features/torque/torque.html, 1998, pp. 1-9, The American Society of Mechanical Engineers.

Aliens (Movie), Starring Sigourney Weaver, Directed by James Cameron, Written by James Cameron, David Giler, Walter Hill, Dan O'Bannon, and Ronald Shuset, Released 1985 by Twentieth Century Fox, Scenes at Playtime 88:26:31-00:26:59 & 00:27:40-00:28:05 & 02:08:25-02:10:39 Non-Patent Literature documentation; Aliens(1986)—IMDb; downloaded Sep. 27, 2014; 4 pages; http://www.imdb.com/title/tt10090605/.

Amikabir University of Technology, Manipulator Dynamics (Power Point), Computer Engineering and Information Technology Department, to the best of applicant's knowledge article was available before the application filing date, 44 pages.

Barras, Stabilization of a Biped Robot with its arms—A Practical Approach, http://biorob.epfl.ch/files/content/sites/biorob/filed/users/170220/public/Report.pdf; May 2010, 33 pages, EPFL Biorobotics Laboratory (BioRob), Switzerland.

Bauman, Utah Firm Markets on Big Gorilla of an Arm, Deseret News; Jan. 27, 1993, 2 pages, Deseret News Publishing Company, Salt Lake City, Utah.

Claeyssen et al., Magnetostrictive actuators compared to piezoelectric actuators, Proceedings of SPIE—The International Society for Optical Engineering 4763, Mar. 2003, 6 pages.

Digital World Tokyo, Giant Robot Grabbing Hands Grab All They Can, www.digitalworldtokyo.com/index.php/digital_tokyo/articles/giant_robot_grabbing_hands_grab_all_they_can/, Jul. 17, 2007, 3 pages.

Elliott et al., The Biomechanics and Energetics of Human Running using an Elastic Knee Exoskeleton, Jun. 2013, 7 pages, IEEE International Conference on Rehabilitation Robotics, Seattle, Washington.

Elliott et al., Design of a Clutch-Spring Knee Exoskeleton for Running, Journal of Medical Devices, Sep. 2014, 11 pages, vol. 8, The American Society of Mechanical Engineers, New York City, New York.

Endo et al., A quasi-passive model of human leg function in level-ground walking, 2006 IEEE/RSJ International Conference on Intelligent Robots and Systems, Oct. 9-15, 2006, pp. 4935-4939, Institute of Electrical and Electronics Engineers, Piscataway, New Jersey.

Gauthier et al., Magnetic Shape Memory Alloy and Actuator Design, Conference: 5th International Workshop on Microfactories (IWMF'06), Oct. 2006, 5 pages, Besançon, France.

Grabowski et al., Exoskeletons for Running and Hopping Augmentation, Journal of Applied Physiology, http://biomech.media.mit.edu/portfolio_page/load-bearing-exoskeleton-for-augmentation-of-human-running/, 2009, 4 pages, vol. 107, No. 3, American Physiological Society, United States.

Gupta et al., Master-Slave Control of a Teleoperated Anthropomorphic Robotic Arm With Gripping Force Sensing, IEEE Transactions on Instrumentation and Measurement, 2006, p. 2136-2145, vol. 55, No. 6, IEEE Xplore.

Gupta et al., Master-Slave Control of a Teleoperated Anthropomorphic Robotic Arm with Gripping Force Sensing, IEEE Transactions on Instrumentation and Measurement Technology Conference, 2006, p. 2203-2208, Canada.

(56) References Cited

OTHER PUBLICATIONS

Gupta et al., Wireless Master-Slave Embedded Controller for a Teleoperated Anthropomorphic Robotic Arm with Gripping Force Sensing, International Conference on Networking, International Conference on Systems and International Conference on Mobile Communications and Learning Technologies, 2006, 6 pages.

Hauser et al., JammJoint: A Variable Stiffness Device Based on Granular Jamming for Wearable Joint Support, IEEE Robotics and Automation Letters, Apr. 2017, 7 pages, vol. 2, Issue 2, Institute of Electrical and Electronics Engineers, Piscataway, New Jersey.

Huber et al., The selection of mechanical actuators based on performance indices, Oct. 8, 1997, pp. 2185-2205, vol. 453 Issue 1965, The Royal Society, London.

Hunter et al., Fast Reversible NiTi Fibers for Use In Microrobotics, Proceedings. IEEE Micro Electro Mechanical Systems, Jan. 30-Feb. 2, 1991, pp. 166-170, Institute of Electrical and Electronics Engineers, Piscataway, New Jersey.

Industrial Magnetics, Inc., PowerLift® Magnets; www.magnetics.com/product.asp?ProductID=1; as accessed Nov. 6, 2012, 2 pages; Boyne City, Michigan.

Jacobsen et al., Research Robots for Application in AI, Teleoperation and Entertainment, Proceedings of the International Fluid Power Exposition and Technical Conference, Mar. 24-24, 1992, pp. 1-19, Chicago, Illinois.

Jacobsen et al., Research Robots for Applications in Artificial Intelligence, Teleoperation and Entertainment; The International Journal of Robotics Research; Apr.-May 2004, pp. 319-330, vol. 23, No. 4-5, SAGE Publications, Thousand Oaks, California.

Jacobsen, Science, Robotics, and Superheroes, Presented at Department of Science University of Utah Science at Breakfast, Mar. 17, 2010, 16 pages.

Jafari et al., A Novel Actuator with Adjustable Stiffness (AwAS), Oct. 18-22, 2010, 6 pages, IEEE/RSJ International Conference on Intelligent Robots and Systems, Taiwan.

Jansen et al., Exoskeleton for Soldier Enhancement Systems Feasibility Study, Sep. 2000, 44 pages, Oak Ridge National Laboratory, Oak Ridge, Tennessee.

Kazerooni, Berkeley Lower Extremity Exoskeleton (BLEEX), to the best of applicant's knowledge article was available before the application filing date, 3 pages, University of California, Berkeley, Berkeley, California.

Kim, Development of a small 6-axis force/moment sensor for robot's fingers, Measurement Science and Technology, Sep. 30, 2004, 2 pages, Issue 11, Institute of Physics and IOP Publishing Limited.

Kim et al, A Force Reflected Exoskeleton-Type Masterarm for Human-Robot Interaction, IEEE Transactions on Systems, Man and Cybertentics—Part A: Systems and Humans, Mar. 2005, pp. 198-212, vol. 35, No. 2, Institute of Electrical and Electronics Engineers, Piscataway, New Jersey.

Kulick, An Unpowered Exoskeleton Springs Into Action: Researchers Increase Walking Efficiency, http://www.cmu.edu/me/news/archive/2015/collins-clutch.html, Apr. 1, 2015, 2 pages, Carnegie Mellon University Mechanical Engineering, Pittsburgh, Pennsylvania.

Laliberte et al., Underactuation in Space Robotic Hands, Proceeding of the 6th International Symposium on Artificial Intelligence and Robotics & Automation in Space, Jun. 18-22, 2001, 8 pages, Canadian Space Agency, Canada.

Magnetic Base, www.ask.com/wiki/magnetic_base; page last updated Sep. 12, 2012, 2 pages, retrieved from www.ask.com/wiki/magnetic_base.

Miao et al., Mechanical Design of Hybrid Leg Exoskeleton to Augment Load-Carrying for Walking, International Journal of Advanced Robotic Systems, Mar. 28, 2013, 11 pages, vol. 10, Intech open science open minds, Europe.

Mirfakhrai et al., Polymer artificial muscles, materialstoday, Apr. 2007, pp. 30-38, vol. 10 No. 4, Elsevier, Netherlands.

Mombaur et al., HEiKA-EXO: Optimization-based development and control of an exoskeleton for medical applications, http://typo.iwr.uni-heidelberg.de/groups/orb/research/heika-exo/, Optimization in Robotics & Biomechanics, Oct. 20, 2014, 3 pages, Germany.

Moosavian et al., Dynamics Modeling and Tip-Over Stability of Suspended Wheeled Mobile Robots with Multiple Arms, 2007 IEEE/RSJ International Conference on Intelligent Robots and Systems, Oct. 29-Nov. 2, 2007; pp. 1210-1215, Institute of Electrical and Electronics Engineers, Piscataway, New Jersey.

Newport Corporation, Heavy-Duty Magnetic Base, 300 lb (1334 N) Holding Force, ¼-20 Thread, http://search.newport.com/?q=* &x2=sku&q2=200, as accessed Apr. 23, 2011, 1 page, Irvine, CA.

Oak Ridge National Laboratory, Foot Force-Torque Sensor Novel Sensor for Measuring Forces and Torques at the Foot, www.ornl.gov, to the best of applicant's knowledge article was available before the application filing date, 1 page, Oak Ridge National Laboratory, Oak Ridge, Tennessee.

Omega, Load Cell Designs, www.omega.com/literature/transactions/volume3/load3.html, Nov. 1, 2005, 3 pages.

Ostling, Wearable Robots, Technology Review, Jul./Aug. 2004, pp. 70-73, Elizabeth Bramson-Boudreau, Cambridge, Massachusetts.

Pan, Improved Design of a Three-degree of Freedom Hip Exoskeleton Based on Biomimetic Parallel Structure, Jul. 2011, 132 pages, University of Ontario Institute of Technology, Canada.

Pelrine et al., Electrostriction of polymer dielectrics with compliant electrodes as a means of actuation, Sensors and Actuators A: Physical, Jan. 1998, pp. 77-85, vol. 64 Issue 1, Elsevier, Netherlands.

Pelrine et al., High-field deformation of elastomeric dielectrics for actuators, Materials Science and Engineering, Nov. 28, 2000, pp. 89-100, vol. 11 Issue 2, Elsevier, Netherlands.

Pelrine et al., Dielectric Elastomer Artificial Muscle Actuators: Toward Biomimetic Motion, Proceedings of SPIE—The International Society for Optical Engineering, Jul. 2002, pp. 126-137, vol. 4695, SPIE, Bellingham, WA.

Pin, Wearable Robotics Presented to New Horizons in Science Briefing, Oct. 2003, 34 pages, Knoxville, Tennessee.

Pratt et al., The RoboKnee: An Exoskeleton for Enhancing Strength and Endurance During Walking, International Conference on Robotics & Automation, Apr. 2004, 6 pages, IEEE, New Orleans, LA.

Robotics Research Group, Degrees of Freedom, www.robotics.utexas.edu/rrg/learn_more/low_ed/dof/, Oct. 25, 2006, 2 pages, University of Texas.

Rouse et al., Clutchable Series-Elastic Actuator: Design of a Robotic Knee Prosthesis for Minimum Energy Consumption, 2013 IEEE 13th International Conference on Rehabilitation Robotics (ICORR), Jun. 24-26, 2013, 6 pages, Institute of Electrical and Electronics Engineers, Piscataway, New Jersey.

Schuler et al., Dextrous Robot Arm, In Proceedings of the $8^{th}$ ESA Workshop on Advanced Space Technologies for Robotic and Automation 'ASTRA 2004' ESTEC, Nov. 2-4, 2004, 8 pages, Noordwijk, The Netherlands.

Searchmap Blog, Scientists Develop Mechanical Spring-Loaded Leg Brace to Improve Walking, http://www.searchrap.en/blog/scientists-develop-mechanical-spring-loaded-leg-brace-to-improve-walking/, Apr. 1, 2015, 5 pages, Searchmap Blog.

Seppala, These exoskeleton heels could help stroke victims walk again, https://www.engadget.com/2015/04/02/feet-exoskeletons/, Apr. 2, 2015, Engadget, San Francisco, California.

Shamaei et al., Estimation of Quasi-Stiffness of the Human Knee in the Stance Phase of Walking, Mar. 22, 2013, 10 pages, vol. 8 Issue 3, PLOS One, San Francisco, California.

Siddharth et al., Design and Analysis of a 1-DOF Walking Mechanism, http://siddharthswaminathan.in/files/WalkingMechanism.pdf, Nov. 2012, 7 pages, India.

Smith et al., Integrated thin-film piezoelectric traveling wave ultrasonic motors, Sensors and Actuators A: Physical, Dec. 2012, pp. 305-311, vol. 188, Elsevier, Netherlands.

Song et al, Kinematics Analysis and Implementation of a Motion-Following Task for a Humanoid Slave Robot Controlled by an Exoskeleton Master Robot, International Journal of Control, Automation and Systems, Dec. 2007, pp. 681-690, vol. 5, No. 6, Korean Institute of Electrical Engineers, South Korea.

Suitx, Phoenix Medical Exoskeleton, https://www.suitx.com/phoenix-medical-exoskeleton, 3 pages, to the best of the applicant's knowl-

(56) References Cited

OTHER PUBLICATIONS edge article was available before the application filing date, US Bionics, Inc., Berkeley, California.

Suleiman, Engineering an affordable exoskeleton, Phys.org, https://phys.org/news/2014-06-exoskeleton.html, Jun. 12, 2014, 5 pages, Science X Network.

Tadakuma et al., Development of Anthropomorphic Multi-D.O.F. Master-Slave Arm for Mutual Telexistence, IEEE Transactions on Visualization and Computer Graphics, Nov.-Dec. 2005, p. 626-636, vol. 11, No. 6, IEEE.

Tmsuk, Rescue Robot "T-53" release Control Technologies to Control the Synchronous Operation of the Arm, http://robot.watch.impress.co.jp/cda/news/2007/07/18/564.html, as accessed Sep. 1, 2011 5 pages, Robot Watch website.

Ueda et al., Large Effective-Strain Piezoelectric Actuators Using Nested Cellular Architecture With Exponential Strain Amplification Mechanisms, IEEE/ASME Transactions on Mechatronics, Oct. 2010, pp. 770-782, vol. 15 Issue 5, Institute of Electrical and Electronics Engineers, Piscataway, New Jersey.

Vanderborght et al., Variable impedance actuators: A review, Robotics and Autonomous Systems, Dec. 2013, 14 pages, vol. 61, Issue 12, Elsevier, Netherlands.

Walsh, Biomimetic Design of an Under-Actuated Leg Exoskeleton for Load-Carrying Augmentation, Massachusetts Institute of Technology, Feb. 2006, 97 pages, Massachusetts.

Walsh et al., A Quasi-Passive Leg Exoskeleton for Load-Carrying Augmentation, International Journal of Humanoid Robotics, Mar. 8, 2007, 20 pages, vol. 4, No. 3, World Scientific Publishing Company.

Wang et al., A highly-underactuated robotic hand with force and joint angle sensors, 2011 IEEE/RSJ International Conference on Intelligent Robots and Systems, Sep. 25-30, 2011, 6 pages, Institute of Electrical and Electronics Engineers, Piscataway, New Jersey.

Yeates, Utah-built robot safeguards the workplace, http://www.ksl.com?nid=148&sid=17654421&autostart=y; Oct. 13, 2011, 3 pages, KSL Broadcasting, Salt Lake City, Utah.

Yip et al., High-Performance Robotic Muscles from Conductive Nylon Sewing Thread, 2015 IEEE International Conference on Robotics and Automation (ICRA), May 26-30, 2015, 6 pages, Seattle, Washington.

Zubrycki et al., Novel haptic glove-based interface using jamming principle, Proceedings of the 10$^{th}$ International Workshop on Robot Motion and Control, Jul. 6-8, 2015, 6 pages, IEEE, Poland.

International Search Report for International Application No. PCT/US2021/065706 dated May 6, 2022, 15 pages.

Office Action for Japan Application No. 2022-076626 dated May 8, 2023, 12 pages.

* cited by examiner

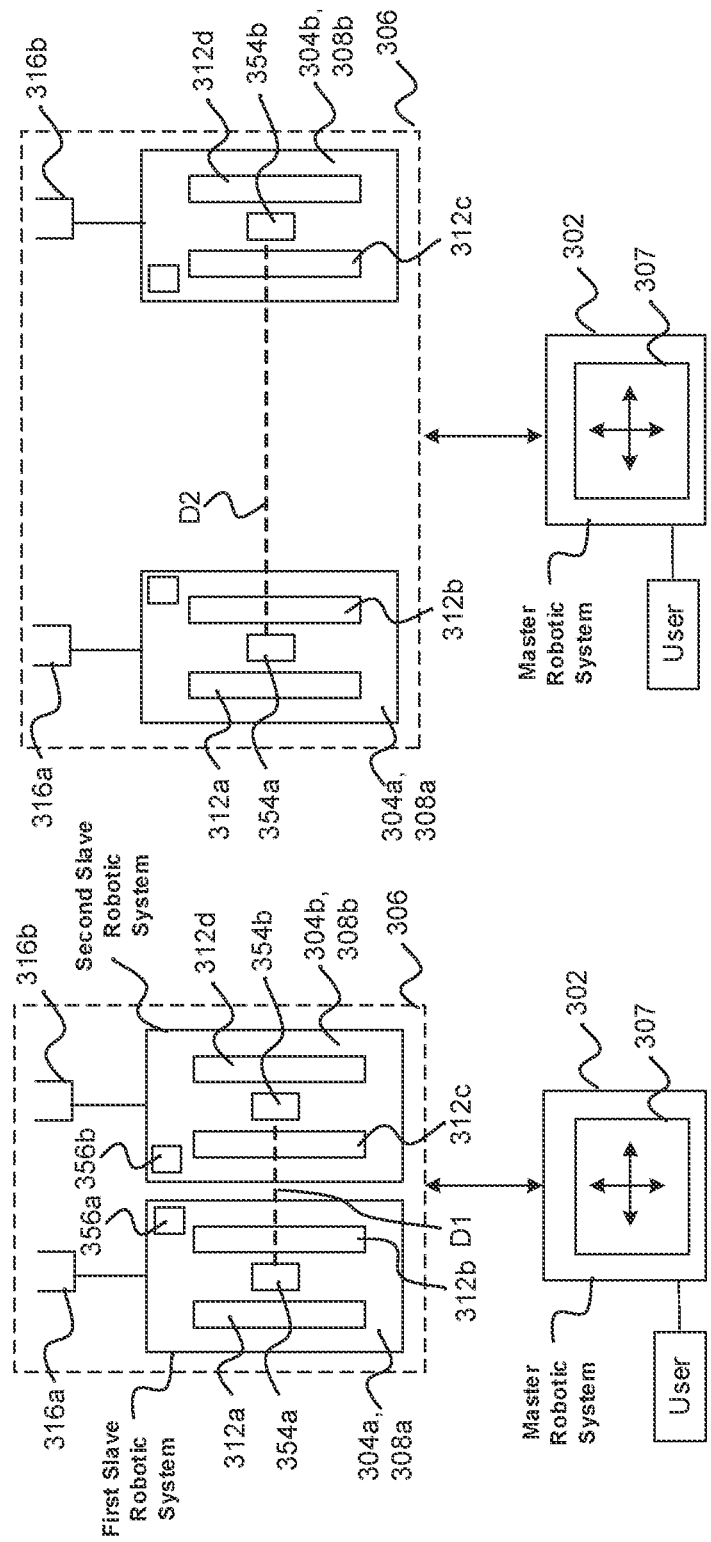

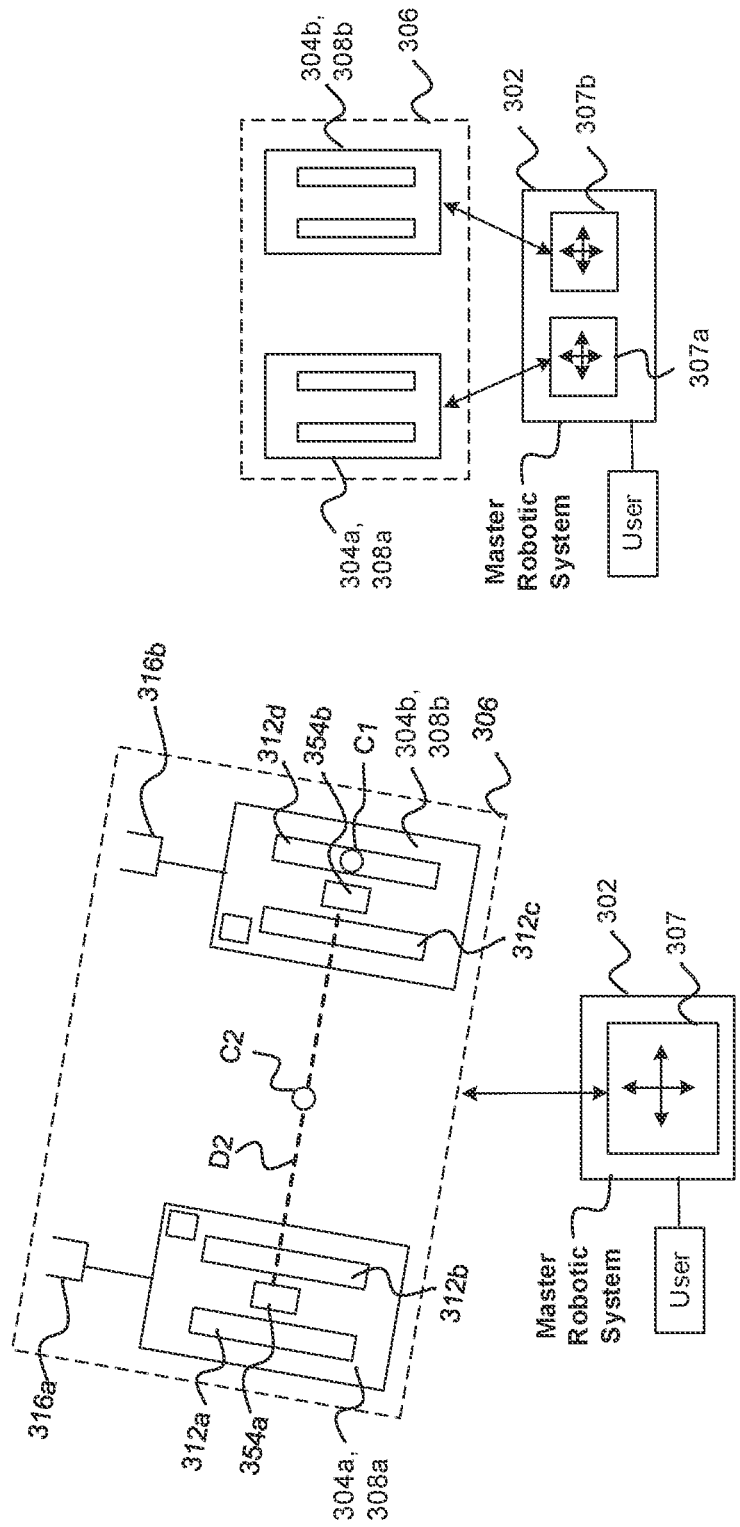

UNIFIED ROBOTIC VEHICLE SYSTEMS AND METHODS OF CONTROL

BACKGROUND

A variety of tasks require assistance of powered devices, systems or vehicles to accomplish the task, such as lifting and moving heavy objects. Some tasks can require a certain amount of stability of the powered assistance device, system or vehicle to lift and move such objects. One type of powered assistance device can comprise a robot or a robotic arm (i.e., a robotic manipulator that comprises a robotic limb (often referred to as a robotic arm) or a robotic limb having an end effector), or a combination of these. In some cases, the robot or robotic manipulator(s) may be mobile (e.g., one or more local or tele-operated robotic manipulators supported about a mobile platform) and able to move over a ground or other surface, such as one or more robotic manipulators supported about a mobile platform, thus allowing the robotic manipulators to be used to perform an increased variety of tasks, or to perform more complex tasks that require, or that would benefit, from mobility of the robot or robotic manipulator(s). While mobile capabilities of a robot or robotic manipulator(s) can be beneficial, in some cases the platform these are supported about is restrictive due to its size. For example, some tasks may require a relatively narrow vehicle or mobile robotic device for egress/ingress through a particular opening, such as a narrow doorway or passageway. While it is possible to design and configure a mobile robot to meet certain mobility requirements, the same robot may suffer from other limitations, such as stability due to its size, particularly when performing a task requiring a certain degree of stability. Or, the same mobile robot may not be able to support multiple robotic manipulators, and thus may not be usable in certain situations, such as in a situation where a task requires multiple robots or robotic manipulators to perform the task. For example, in some facilities, such as nuclear power plants, munitions/explosives storage buildings, industrial buildings or complexes, warehouses, or anywhere else powered assistance is needed or could be used, it can be necessary to move a mobile robotic system through narrow passageways to perform different tasks, because of the risk of harm to humans being in such environments. In addition, some of these tasks can require multiple points of powered assisted manipulation (i.e., locations where powered assistance is to be applied to accomplish the task) (e.g., two robotic manipulators carrying a pipe). Based on this, the ability of many mobile robots to carry out a wide variety of tasks has been limited due to the limitations of the robotic manipulators, mobility platform, or a combination of these.

BRIEF DESCRIPTION OF THE DRAWINGS

FIG. 10 schematically illustrates first and second robotic systems of FIG. 1 adjacent each other and in the paired control mode, in accordance with one exemplary embodiment.

FIG. 11 schematically illustrates the first and second robotic systems of FIG. 1 separated from each other and still in the paired control mode, in accordance with one exemplary embodiment.

FIG. 12 schematically illustrates the first and second robotic systems of FIG. 1 turning while still in the paired control mode, in accordance with one exemplary embodiment.

FIG. 13 schematically illustrates the first and second robotic systems of FIG. 1, each being controlled by respective first and second input control devices of a master robotic system, in accordance with one exemplary embodiment.

Figure 1:
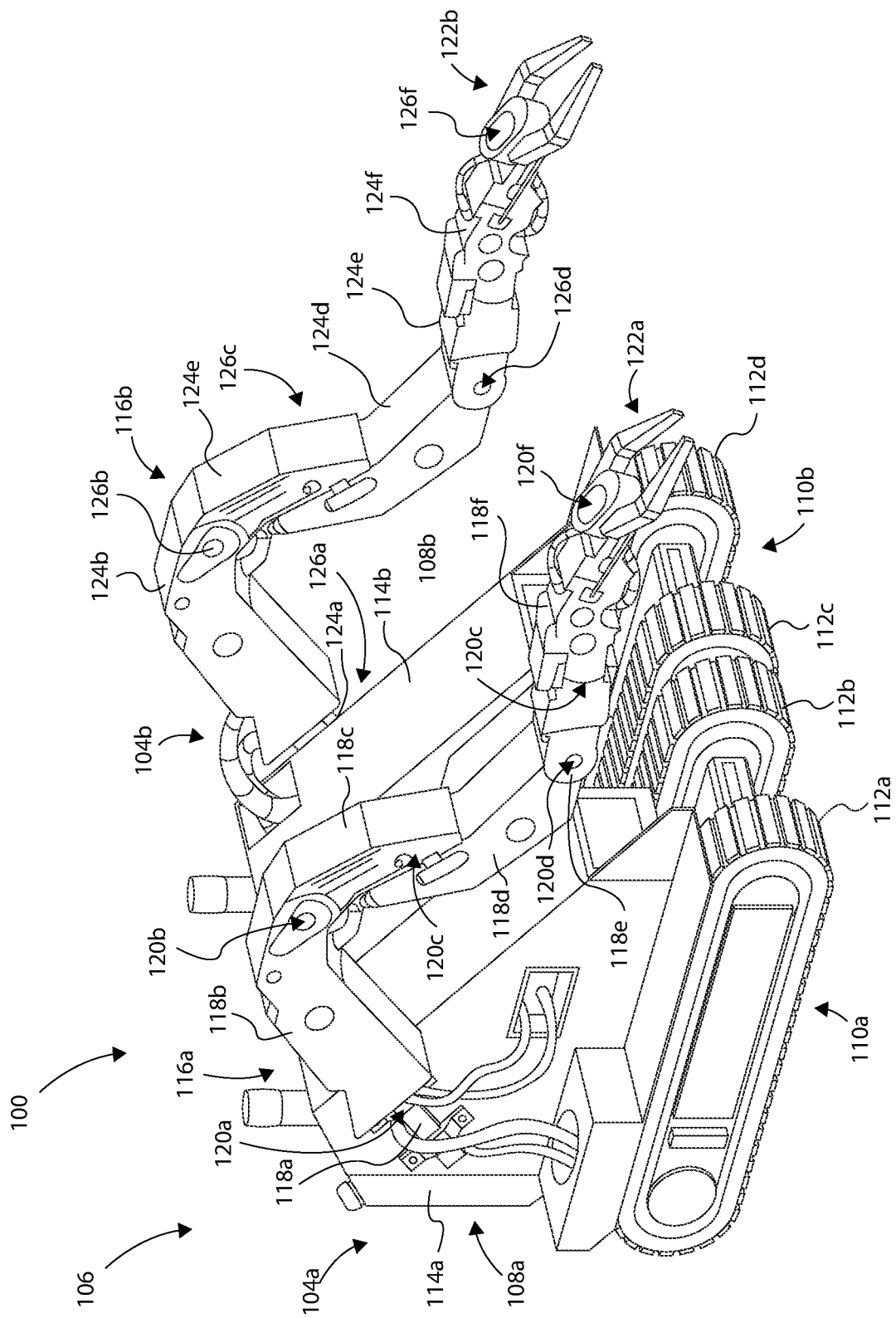
FIG. 1 illustrates first and second robotic systems of a unified robotic system, in accordance with one exemplary embodiment.

Reference will now be made to the exemplary embodiments illustrated, and specific language will be used herein to describe the same. It will nevertheless be understood that no limitation of the scope of the invention is thereby intended.

SUMMARY

An initial overview of the inventive concepts is provided here, and then specific examples are described in further detail later. This initial summary is intended to aid readers in understanding the examples more quickly, but is not intended to identify key features or essential features of the examples, nor is it intended to limit the scope of the claimed subject matter.

The present disclosure sets forth a robotic system, comprising a master robotic system comprising at least one drive input device; a first robotic system comprising a first mobile platform operable to move about a ground or other surface within an environment; a second robotic system comprising a second mobile platform operable to move about the surface; one or more processors; and one or more memory devices operatively coupled to at least one of the one or more processors and having instructions stored thereon that, when executed by at least one of the one or more processors, cause the system to operate in a paired control mode to facilitate paired control of the first and second robotic systems that together define a unified robotic system operable to move about the surface via control of the at least one drive input device.

In one example, the first and second mobile platforms of the first and second robotic systems, respectively, can each comprise a mobility mechanism, and wherein the one or more memory devices can further comprise instructions stored thereon that, when executed by at least one of the one or more processors, cause the system to operate in a paired drive control mode of the paired control mode that facilitates operation of the mobility mechanisms of the first and second mobile platforms to facilitate movement of the unified robotic system.

In one example, the one or more memory devices can further comprise instructions stored thereon that, when executed by at least one of the one or more processors, cause the system to operate in the paired drive control mode to facilitate movement of the unified robotic system as if the first and second mobile platforms are movable as a single, unitary mobile platform.

In one example, the one or more memory devices can further comprise instructions stored thereon that, when executed by at least one of the one or more processors, cause the system to operate in a paired control drive mode to facilitate paired control of the first and second mobile platforms.

In one example, the one or more memory devices can further comprise instructions stored thereon that, when executed by at least one of the one or more processors, cause the system to operate in an unpaired control mode to facilitate unpaired control of a selected one of the first or second mobile platforms via control of the at least one drive input device, and the one or more memories or memory devices further comprising instructions stored thereon that, when executed by at least one of the one or more processors, cause the system to switch between the paired control mode and the unpaired control mode via operation of a switch input device of the master robotic system.

In one example, the one or more memory devices can further comprise instructions stored thereon that, when executed by at least one of the one or more processors, cause the system to operate in an autonomous pairing mode that facilitates the first and second mobile platforms autonomously moving to a paired position relative to each other based on position data generated by a position sensor on each of the first and second robotic systems.

In one example, the first robotic system can comprises a first manipulator supported by the first mobile platform, and wherein the second robotic system can comprise a second manipulator supported by the second mobile platform, the one or more memory devices further comprising instructions stored thereon that, when executed by at least one of the one or more processors, cause the system to operate in a paired manipulator control mode that facilitates paired control of the first and second manipulators via operating respective first and second control manipulator input devices of the master robotic system.

In one example, the first and second manipulators are each equipped with an end effector operable in the paired manipulator control mode that facilitates paired control of the end effectors.

In one example, the at least one drive input device can comprises a first drive input device and a second drive input device, wherein, when in the paired control mode, the first and second drive input devices are operable by a user to control movement of the unified robotic system, and wherein, when in the unpaired mode, one of the first or second drive input devices is operable by the user to control movement of a selected one of the first or second robotic systems.

In one example, the first and second drive input devices facilitate user control of movement of the first and second mobile platforms remotely located from each other and when operated in the paired control mode.

In one example, the first mobile platform can comprise a first mobility mechanism, and wherein the second mobile platform comprises a second mobility mechanism, wherein, when in a paired drive control mode of the paired control mode, the at least one drive input device is operable to control the first mobility mechanism and the second mobility mechanism.

In one example, the first mobile platform can comprise a first coupling mechanism, and wherein the second mobile platform can comprise a second coupling mechanism, wherein, when in a paired drive control mode of the paired control mode, the first and second coupling mechanisms are operable to physically couple together the first and second mobile platforms.

In one example, the master control system can comprise an exoskeleton structure comprising first and second master control manipulators (that may or may not be kinematically consistent) associated with respective first and second manipulators of the respective first and second robotic systems for control thereof.

In one example, the master control system can comprise one of an exoskeleton-based master control system, a replica-based master control system, an accelerometer-based master control system, a brake-based master control system, or an end point control-based master control system In one example, the master robotic system can comprise at least one switch input device operable by a user to switch between the paired control mode and an unpaired control mode, the one or more memory devices further comprising instructions stored thereon that, when executed by at least one of the one or more processors, cause the system to operate in the unpaired control mode to facilitate independent control of at least one function of the first and second robotic systems.

In one example, each of the first and second robotic systems can comprise at least one position location sensor, the one or more processors configured to receive position and/or orientation data associated with the position location sensors to determine a distance between and a relative orientation of the first and second mobile platforms, and the one or more memory devices further comprising instructions stored thereon that, when executed by at least one of the one or more processors, cause the system to operate in a paired drive control mode to control respective movement of the first and second mobile platforms in a coordinated manner based on the determined distance between and relative orientation of the first and second mobile platforms.

In one example, the second robotic system can comprise a second manipulator supported by the second mobile platform, and a force sensor associated with a joint of the second manipulator, the one or more memory devices further comprising instructions stored thereon that, when executed by at least one of the one or more processors, cause the system to operate in a follow-me mode that actively controls the first robotic system while passively controlling the second robotic system based on a force output signal provided by the force sensor when end effectors of the first and second manipulators are supporting and moving a common payload, such that the second robotic system follows movement of the first robotic system.

In one example, the one or more memory devices further comprises instructions stored thereon that, when executed by at least one of the one or more processors, cause the system to operate in an autonomous mode, a semi-autonomous mode, or a supervised autonomous mode for control of at least one function of at least one of the first or second mobile platforms.

The present disclosure also sets faith a robotic vehicle control system, comprising a first robotic vehicle having a mobility mechanism for moving about a surface within an environment; a second robotic vehicle having a mobility mechanism for moving about the surface; one or more processors; and one or more memory devices operatively coupled to at least one of the one or more processors and having instructions stored thereon that, when executed by at least one of the one or more processors, cause the system to operate in a paired control mode to facilitate paired control of the first and second robotic vehicles so as to define a unified robotic vehicle system operable to move about the surface under user control, and to switch to an unpaired control mode to facilitate independent movement of at least one of the first or second robotic systems relative to each other.

In one example, the one or more memory devices can further comprise instructions stored thereon that, when executed by at least one of the one or more processors, cause the system to operate in a paired drive control mode to facilitate coordinated control of the mobility mechanisms of the first and second robotic vehicles.

In one example, the one or more memory devices can further comprise instructions stored thereon that, when executed by at least one of the one or more processors, cause the system to switch to an unpaired control mode to facilitate independent control of movement of the first robotic vehicle or the second robotic vehicle, and wherein the one or more memory devices further comprises instructions stored thereon that, when executed by at least one of the one or more processors, cause the system to switch between the paired control mode and the unpaired control mode.

In one example, the one or more memory devices can further comprise instructions stored thereon that, when executed by at least one of the one or more processors, cause the system to operate in a paired manipulator control mode that facilitates paired control of first and second manipulators supported on the respective first and second robotic vehicles.

In one example, the first and second manipulators can each be equipped with an end effector operable in the paired manipulator control mode that facilitates paired control of the end effectors.

In one example, the mobility mechanisms of the first and second robotic vehicles can each comprise at least one of a pair of tracks or a set of wheels.

In one example, each of the first and second robotic vehicles can comprise a position location sensor to generate position and orientation data, the one or more memory devices further comprising instructions stored thereon that, when executed by at least one of the one or more processors, cause the system to determine a distance, based on the position data, between the first and second robotic vehicles, and to determine an orientation, based on the orientation data, of each of the first and second robotic vehicles relative to each other, to control respective movement of the mobility mechanisms of the first and second robotic vehicles in a coordinated manner.

In one example, the robotic vehicle control system can further comprise a stabilizing robotic vehicle having a mobility mechanism for moving about the surface, and operable with at least one of the first or second robotic vehicles, wherein the one or more memory devices further comprises instructions stored thereon that, when executed by at least one of the one or more processors, cause the system to operate in a paired control mode to facilitate paired control of at least one of the first or second robotic vehicles and the stabilizing robotic vehicle so as to define a unified robotic vehicle system operable to move about the surface under user control, and to switch to an unpaired control mode to facilitate independent movement of at least one of the first robotic vehicle or the second robotic vehicle or the stabilizing robotic vehicle relative to one another.

In one example, the second robotic vehicle can comprise a stabilizing robotic vehicle operable with the first robotic vehicle to stabilize the first robotic vehicle.

The present disclosure further sets forth a method of operating a plurality of robotic vehicles, the method comprising operating individual first and second robotic vehicles in an unpaired control mode to facilitate independent control of the first robotic vehicle and the second robotic vehicle about a surface within an environment; switching to a paired control mode for paired control of the first and second robotic vehicles; and operating the first and second robotic vehicles to move together in a coordinated manner about the ground surface.

In one example, switching to the paired control mode comprises switching to a paired drive control mode, the method further comprising operating mobility mechanisms of first and second robotic vehicles to move together the first and second robotic vehicles as a single robotic vehicle.

In one example, the method can further comprise operating a robotic vehicle control system to control movement of the first and second robotic vehicles.

In one example, the method can further comprise operating a switch input device of the robotic vehicle control system to facilitate the switching to the paired control mode.

In one example, the method can further comprise operating at least one drive input device of the robotic vehicle control system to facilitate coordinated ground movement of the first and second robotic vehicles.

In one example, the method can further comprise determining a distance, with one or more processors of a robotic vehicle control system, between the first and second robotic vehicles using position data provided by respective position location sensors of the first and second robotic vehicles, the method further comprising determining an orientation, with the one or more processors, of each of the first and second robotic vehicles relative to each other using orientation data provided by respective position location sensors, the method further comprising operating the first and second robotic vehicles in the paired control mode based on the determined distance and determined relative orientation for coordinated control of movement of the first and second robotic vehicles.

In one example, the method can further comprise selecting a turning point relative to a determined position and orientation of the first robotic vehicle relative to the second robotic vehicle to facilitate coordinated control of movement of the first and second robotic vehicles.

In one example, the first robotic vehicle can comprise a first robotic system having a first mobile platform and a first manipulator, and wherein the second robotic vehicle can comprise a second robotic system having a second mobile platform and a second manipulator, the method further comprising operating a master control system for coordinated control the first and second mobile platforms and first and second manipulators.

The present disclosure still further sets forth one or more non-transitory computer readable storage medium storing instructions that, when executed by one or more processors, cause the one or more processors to establish an unpaired control mode of operating first and second vehicles; control movement of the first vehicle about a surface within an environment; control movement of the second vehicle about the surface independently from the first vehicle, switch to a paired control mode to facilitate paired control of the first and second vehicles to define a unified vehicle system; and control movement of the unified vehicle system about the surface, such that the first and second vehicles move together in a coordinated manner.

In one example, the one or more non-transitory computer readable storage media can further comprise instructions that, when executed by the one or more processors, cause the one or more processors to switch to a paired drive control mode of the paired control mode to facilitate control of first and second mobility mechanisms of respective first and second vehicles.

In one example, the one or more non-transitory computer readable storage media can further comprise instructions that, when executed by the one or more processors, cause the one or more processors to transmit command signals, associated with user movement from operating a master robotic system, to the unified vehicle system for controlling movement of the first and second vehicles in the paired control mode.

In one example, the one or more non-transitory computer readable storage media can further comprise instructions that, when executed by the one or more processors, cause the one or more processors to determine a distance between the first and second vehicles based on position data generated from position location sensors on the respective first and second vehicles, determine an orientation of the first and second vehicles relative to each other and to control movement of the first and second vehicles in a coordinated manner based on the determined distance and relative orientation.

The present disclosure still further sets forth a robotic system comprising a master robotic system; a first robotic system comprising a first mobile platform operable to move about a ground or other surface within an environment, and comprising a first manipulator supported by the first mobile platform; a second robotic system comprising a second mobile platform operable to move about the ground surface, and comprising a second manipulator supported by the second mobile platform; at least one force sensor operably coupled to the second manipulator, the at least one force sensor configured to generate at least one three output signal associated with a load applied to the second manipulator; one or more processors; and one or more memory devices operatively coupled to at least one of the one or more processors and having instructions stored thereon that, when executed by at least one of the one or more processors, cause the system to operate in a follow-me mode to actively control the first robotic system while passively controlling the second robotic system based on the at least one force output signal when end effectors of the first and second manipulators are supporting a common payload, such that the second robotic system passively follows movement corresponding to actively controlled movement of the first robotic system via the master control system.

In one example, the second robotic system can comprise a mobility mechanism, and wherein the second manipulator can comprise a plurality of joints, the second robotic system further comprising a plurality of force sensors associated with respective joints, and wherein the one or more memory devices further comprises instructions stored thereon that, when executed by at least one of the one or more processors, cause the system to transmit command signals to the second robotic system to operate at least one joint and the mobility mechanism of the second robotic system based on at least one output signal from at least one force sensor to facilitate passive movement of the second robotic system in response to controlled movement of the first robotic system.

In one example, at least some of the joints can be operable to passively move about a respective degree of freedom and to passively operate under a force threshold based on a load applied to the second manipulator from the common payload when supported by the end effectors of the first and second manipulators.

In one example, the mobility mechanism can be operable to passively move about a ground surface based on a load applied to the second manipulator from the common payload when supported by the first and second manipulators.

The present disclosure still further sets forth a robotic vehicle control system, comprising a first robotic vehicle having a mobility mechanism for moving about a ground surface, and supporting a robotic manipulator having an end effector; a stabilizing robotic vehicle having a mobility mechanism for moving about a ground surface; one or more processors; and one or more memory devices operatively coupled to at least one of the one or more processors and having instructions stored thereon that, when executed by at least one of the one or more processors, cause the system to operate in a paired control mode to facilitate paired control of the first robotic vehicle and the stabilizing robotic vehicle so as to define a unified robotic vehicle system operable to move about the ground surface under user control, and to switch to an unpaired control mode to facilitate independent control of movement of at least one of the first robotic vehicle or the stabilizing robotic vehicle relative to one another.

In one example, the robotic vehicle control system can further comprise a second robotic vehicle having a mobility mechanism for moving about a around surface, and supporting a robotic manipulator having an end effector, wherein the second robotic vehicle is operable with the first robotic vehicle and the stabilizing robotic vehicle so as to further define the unified robotic vehicle for coordinated control of ground movement of the first and second robotic vehicles and the stabilizing robotic vehicle.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the singular forms "a," and, "the" include plural referents unless the context clearly dictates otherwise. Thus, for example, reference to "a robotic manipulator" includes one or more of such robotic manipulators and reference to a "degree of freedom" (DOF) includes reference to one or more of such DOFs (degrees of freedom).

The phrase "paired control mode" is intended to refer to a control mode or method for coordinated control of at least one functional aspect of two or more robotic vehicles. The term "pair" as used in some examples herein is not intended to limit any definition or example herein as being only "two in a pair", rather, the term "pair" is intended to refer to as two or more robotic vehicles (or components thereof) that may be controllable in a coordinated manner while operating a system in the paired control mode.

The phrase "unpaired control mode" is intended to refer to a control mode or method for independent or separated control of at least one functional aspect of two or more robotic vehicles.

The phrase "unified robotic system" is intended to refer to a combination of two or more robotic vehicles or systems operable in the paired control mode.

The term "mobile platform" is intended to refer to a portable or movable assembly of components of a robotic vehicle to facilitate at least controlled locomotion of the robotic vehicle.

The phrase "paired control drive mode" is intended to refer to a control mode or method for coordinated control of locomotion of two or more robotic vehicles.

The phrase "autonomous pairing mode" is intended to refer to a control mode or method for one or more robotic vehicles automatically moving to particular position(s) for operating in the paired control mode.

The term "manipulator" is intended to refer to a structure or assembly supported by a mobile platform that is operable to be moved in at least one degree of freedom.

The phrase "paired manipulator control mode" is intended to refer to a control mode or method for coordinated control of two or more manipulators that may be supported by one or more robotic vehicles.

The phrase "master robotic system" is intended to refer to a primary controller or system for controlling at least one functional aspect of one or more robotic vehicles.

The phrase "mobility mechanism" is intended to refer to a plurality of the components of a robotic vehicle or system used for locomotion of the robotic vehicle, including but not limited to components such as tracks, wheels, propellers, thrusters, water jets, claws, grippers, etc. for moving a mobile platform through or in an environment, or on or along a ground or other surface, such as a structural surface.

The term "environment" is intended to refer to any area in which one or more mobile platforms can move through or in, including but not limited to movement on land, on vessels, in facilities, in fluids (e.g., bodies of water, such as oceans), through an atmosphere, on spacecraft, and/or in space.

Figure 2:
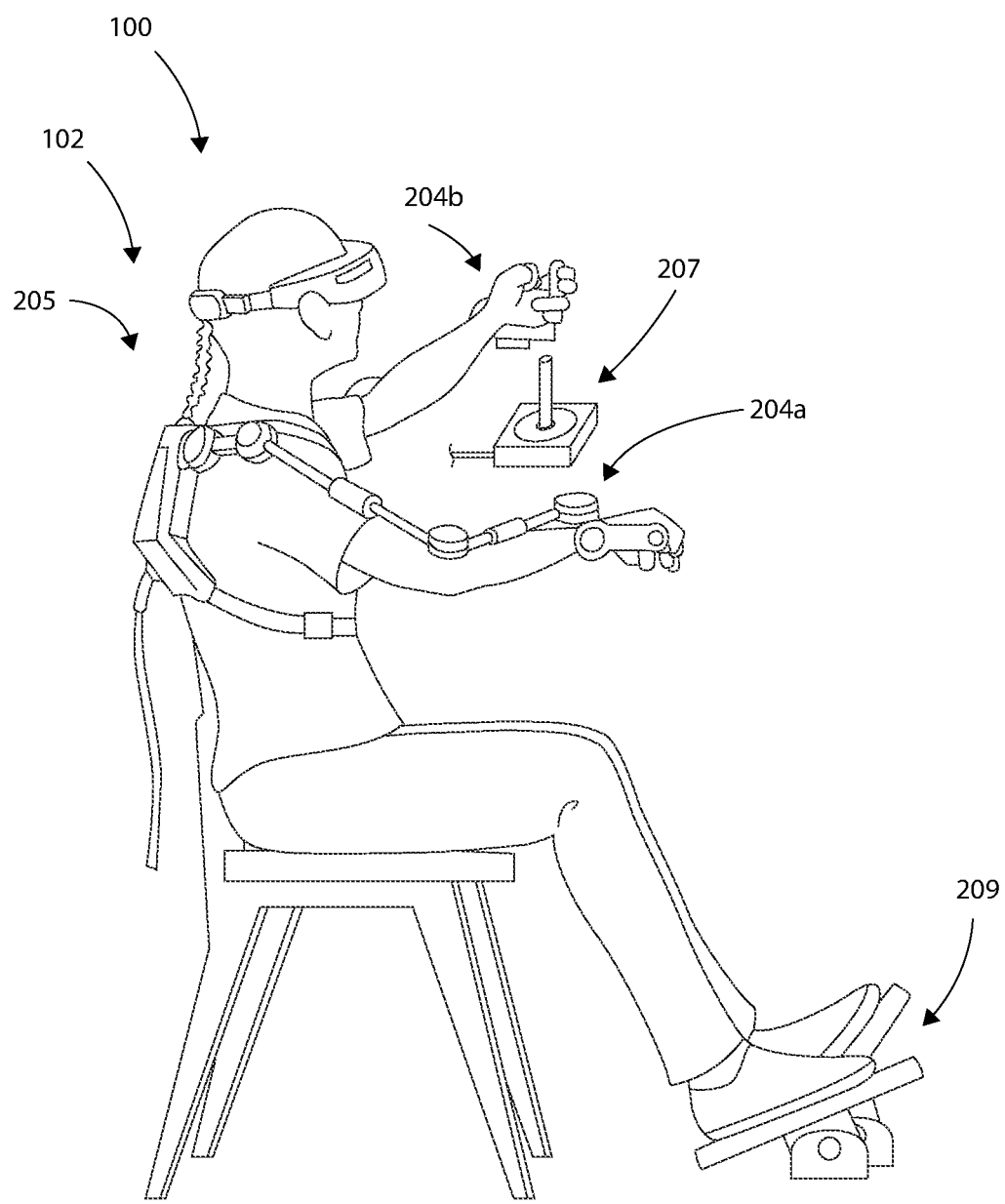
FIG. 2 illustrates aspects of a master robotic system for controlling the first and second robotic systems of FIG. 1, in accordance with one exemplary embodiment.
Figure 16:
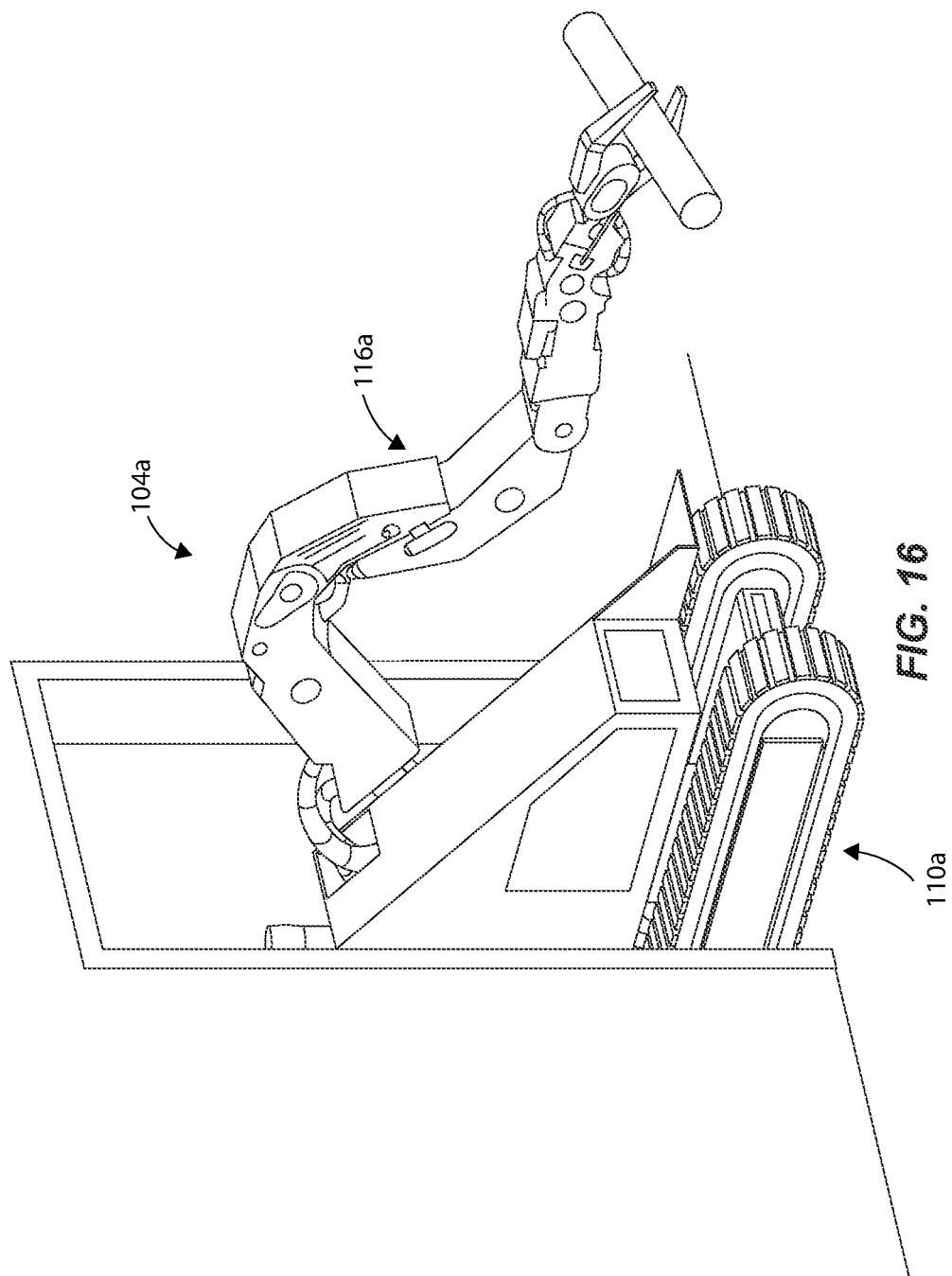
FIG. 16 illustrates the first robotic system of FIG. 1 moving through a narrow passageway, and while separated from the second robotic system, in accordance with one exemplary embodiment.
Figure 17:
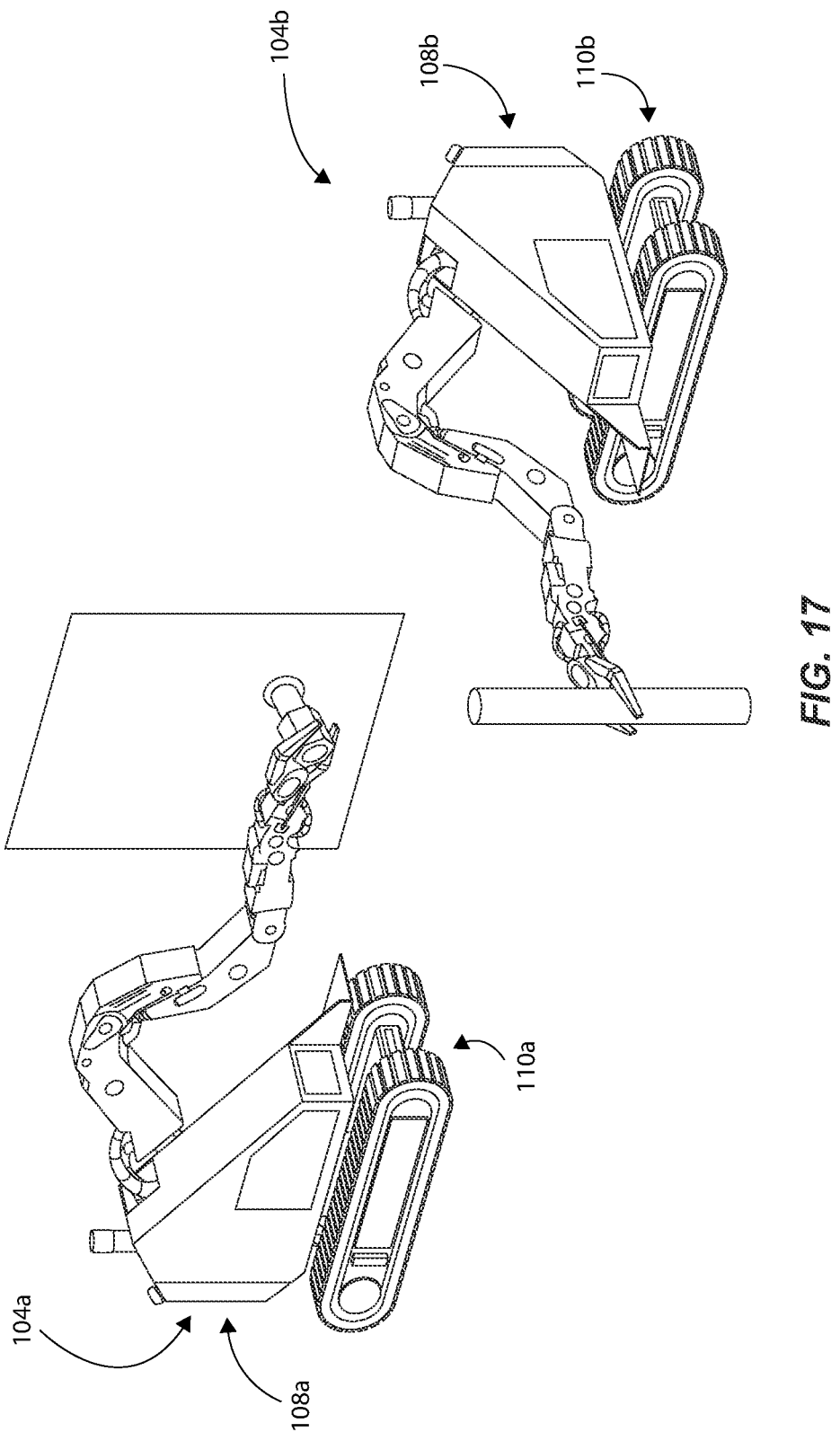
FIG. 17 illustrates the first and second robotic systems of FIG. 1 performing different tasks in an unpaired control mode, in accordance with one exemplary embodiment.

The phase "follow-me mode" is intended to refer to a control mode or method of one or more robotic vehicles or systems autonomously or semi-autonomously following movement of a leading robotic vehicle. To further describe the present technology, examples are now provided with reference to the figures. FIGS. 1 and 2 illustrate a robotic system (e.g., a tele-operated robotic system, an autonomous or semi-autonomous robotic system, and others) that can comprise a master robotic system 102 (see FIG. 2) (e.g., a robotic vehicle control system) and first and second robotic systems 104a and 104b (e.g., robotic vehicles), each of the first and second robotic systems 104a and 104b being independent, separate and distinct robotic systems that can be controlled and operated independent of the other. As an overview, the master robotic system 102 can be operated by a user or individual to selectively control one or both of the first and second robotic systems 104a and 104b. Thus, the first and second robotic systems 104a and 104h can be selectively operated (i.e., the user can select which robotic system to individually control, or the user can control both simultaneously). For example, using the master robotic system 102, the user can select the unpaired control mode to operate one or both of the robotic systems individually. On the other hand, the first and second robotic systems 104a and 104b can be selectively operated by the master robotic system 102 together in a coordinated or harmonized manner when in a paired control mode, as further detailed below. That is, the first and second robotic systems 104a and 104b can be operated in the paired control mode when physically adjacent to each other to perform a common task (e.g., FIG. 3), and further operated in the same paired control mode when separated or remotely located from each other to perform a common task (e.g., FIG. 4). When in the paired control mode, the first and second robotic systems 104a and 104h can define a unified robotic system 106 (see e.g., FIGS. 1, 3, 4, and 15) (or a "unified robotic vehicle control system"), which is an example of paired control of the first and second robotic systems 104a and 104b. In one sense, the unified robotic system can mean that the first and second robotic systems operate as if they were one, or part of the same robot, with the first and second robotic manipulators supported about a common mobile platform. When in the unpaired control mode, the first and second robotic systems 104a and 104b can be separately operated by the user operating the master control system 102 to perform individual or different tasks, such as illustrated in FIGS. 16 and 17, which is an example of unpaired control of the first and second robotic systems 104a and 104b.

In one example, the first robotic system 104a (which can be referred to as a robotic "vehicle") can comprise a first mobile platform 108a that includes a first mobility mechanism 110a for moving the first robotic system 104a about an environment, such as a ground or other supporting surface as illustrated in this example. In one aspect, the first mobility mechanism 110a can comprise a first pair of tracks 112a and 112b (e.g., continuous tracks) that facilitate such locomotion via one or more motors (not shown). Alternatively, one or more powered wheels can replace the tracks to facilitate locomotion of the mobile platform 110a (and 110b). The first mobile platform 108a can comprise a rigid frame or chassis 114a that supports the first pair of tracks 112a and 112b, and that supports a number of other components for operating the first robotic system 104a, as further detailed below. A portion of the chassis 114a can be rotatably movable relative to the first pair of tracks 112a and 112b by any suitable means, such as illustrated in FIG. 17 (see e.g., 104b), and which can define a degree of freedom (DOF) of the first mobile platform 108a. A first manipulator 116a can be supported by the first mobile platform 108a, and can comprise a plurality of support members 118a-f rotatably coupled together to define a plurality of joints 120a-f that define and provide movement in a number of DOFs of the first manipulator 116a. In some examples, an end effector of any type (e.g., see end effector 122a) can be supported or equipped proximate the end of the first manipulator 116a for manipulating or grabbing objects, tools, etc. The joints 120a-f and the end effector 112a can be powered via motors (e.g., hydraulic, electric, pneumatic). The first manipulator 116a can have more or less DOFs than illustrated, and it can be the same or similar as the manipulator described with reference to U.S. patent application Ser. No. 13/332,165 filed Dec. 20, 2011 ("Tele-operated Robotic System"), which is incorporated by reference in its entirety.

Further to the example in FIG. 1, the second robotic system 104b can be the same or a "mirror image" of the configuration of the first robotic system 104a (or the robotic systems 104a and 104b can be different types). As the same type of robots or robotic vehicles, the second robotic system 104b can comprise a second mobile platform 108b that comprises a second mobility mechanism 110b for moving the second robotic system 104b about a ground or other supporting surface within an environment. In one aspect, the second mobility mechanism 110b can comprise a second pair of tracks 112c and 112d (e.g., continuous tracks) that facilitate locomotion. The second mobile platform 108b can comprise a rigid frame or chassis 114b that supports the second pair of tracks 112c and 112d, and a number of other components for operating the second robotic system 104b, as further detailed below. A second manipulator 116b can be supported by the second mobile platform 108b, and can comprise a plurality of support members 124a-f rotatably coupled together to define a plurality of joints 126a-f that define and provide movement in a number of DOFs of the second manipulator 116b (i.e., powered joints). An end effector of any type (e.g., see end effector 122b) can be equipped or supported proximate the end of the second manipulator 116b for manipulating or grabbing objects, tools, etc, (i.e., a powered gripper). The second manipulator 116b can have more or less DOFs than illustrated, and it can be the same or similar as the manipulator described with reference to U.S. patent application Ser. No. 13/332,165 filed Dec. 20, 2011 ("Tele-operated Robotic System"), which is incorporated by reference in its entirety.

In an alternative example, the manipulators 116a and 116b may not be incorporated or supported by the mobile platforms 108a and 108b, and instead the mobile platforms 108a and 108b can comprise other devices used for other purposes, such as sensors, cameras, etc. for collecting data. Such other devices could also be included with the robotic systems 104a and 104b as shown and described in FIG. 1 (and others).

The master robotic system 102 can comprise first and second master control manipulators 204a and 204h (e.g., control manipulator input devices) as part of an upper body exoskeleton structure 205. The exoskeleton structure 205 can include a headset with a video screen for viewing images captured by cameras on the first and second robotic systems 104a and 104b (and/or for viewing a computer generated environment). The exoskeleton structure 205 can comprise an on-board computer system (e.g., computer system supported in a back pack), having one or more central processing units (CPUs) as discussed below, and/or the exoskeleton structure 205 can be communicatively coupled to a remote computer system via wired or wireless means and having one or more CPUs for processing data and facilitating control of the robotic systems 104a and 104b. It is noted that the terms "manipulator," "robotic manipulator," and "master control manipulator," as used herein, are intended to describe types of robotic devices or mechanisms (e.g., robotic limbs, such as a robotic arm) capable of moving in one or more degrees of freedom. These terms are further intended to describe robotic devices or mechanisms (e.g., robotic limbs, such as a robotic arm) capable of moving in one or more degrees of freedom, and that further comprise or include an end effector supported about and operable with the manipulator.

The first and second master control manipulators 204a and 204h can each comprise a plurality of support members, joints, sensors, etc. (not labeled), and can each correspond to a limb of the operator (e.g., the arm of the operator). In some examples, the first and second master control manipulators 204a and 204b can be (but do not necessarily need to be) kinematically equivalent to the user's respective arm from the shoulder to the wrist. A human arm includes seven degrees of freedom from the shoulder to the wrist. Specifically, a human shoulder includes three DOF: abduction/adduction, flexion/extension, and humeral rotation. A human elbow includes one DOF. A human wrist can be generalized to include three DOF: wrist rotation, abduction/adduction, and flexion/extension. The upper arm extends from the shoulder and is connected to the lower arm by the elbow. The wrist is at the opposite end of the lower arm. The human arm from the shoulder to the wrist can thus be generalized as a kinematic system that includes a first joint having three rotational DOF connected to a second joint having one DOF by a first linkage, which is connected to a third joint having three DOF by a second linkage.

The various support members, joints, sensor, and other components of the first and second master control manipulators 204a and 204b are not labelled and will not be discussed in great detail, but it should be appreciated that the master control manipulators 204a and 204b can be configured as a kinematic system to include DOF and linkages that correspond to the DOF and linkages of the human arm from the shoulder to the wrist. And, it should be appreciated that the DOF of first and second master control manipulators 204a and 204b are operable to control, and are kinematically equivalent to, respective first and second robotic manipulators 104a and 104b.

Note that the first and second master control manipulators 204a and 204b can alternatively be a single master control manipulator (like 204a) for selectively controlling one of the robotic manipulators 116a or 116b, for instance. Further alternatively, one or more digital displays having input buttons or devices can be used to control the robotic systems 104a and 104b. As further discussed below, the user can switch between controlling one of the manipulators 116a and 116b via a switch device, and then the user can use the single master control manipulator (e.g., 204a), or other input device joystick, buttons, etc.), for controlling the selected manipulator.

Each joint of the master control manipulators 204a and 204h and the manipulators 116a and 116b can include a general DOF controller, which can include a general purpose CPU such as an ARM processor, an Intel processor, or the like. Alternatively, a field programmable gate array (FPGA), application specific integrated circuit (ASIC) or other type of processor or microprocessor may be used. The CPU can communicate with load and positions sensors using wired or wireless technologies or means.

In certain aspects, a master control manipulator (e.g., 204a) can include fewer than seven DOF and still be considered kinematically equivalent to a human arm to the extent of the corresponding DOF of the human arm In certain other aspects, a master control manipulator can include greater than seven DOF and still be considered kinematically equivalent to a human arm to the extent of the corresponding DOF of the human arm. In this case, excess DOF that do not correspond to a human arm may not be kinematically equivalent to the human arm.

As used herein, the terms "kinematically equivalent" or "kinematic equivalence" refer to a relationship between two or more separate systems of rigid bodies, wherein the rigid bodies of each system are linked by rotational joints to provide rotational DOF. Kinematically equivalent systems have similar corresponding rotational DOF, which are joined by similar corresponding linkages that are proportional in length between the systems. It is noted that "equivalent" or "equivalence" does not refer to a kinematic identity between the systems. Indeed, "kinematically equivalent" or "kinematic equivalence" can include some degree of variation from true kinematic identity.

The master control manipulators 204a and 204a can have several operating modes for operating and controlling the first and second robotic systems, and particularly the first and second manipulators 116a and 116b. One operating mode is position control. With position control, the positions of the various DOF of the master control manipulator are used to control the position of the various DOF of the manipulators 116a and 116b. The positional relation between a particular master control manipulator and a manipulator can be a proportional relationship. In one aspect, the proportional position relationship between the master control manipulator and the manipulator can be a one-to-one relationship where a certain amount of movement in the master control manipulator results in the same amount of movement in the manipulator. This could be a useful general-purpose control setting. In another aspect, the proportional position relationship between a master control manipulator and a manipulator can comprise something different than one-to-one. For example, a relationship may exist where a large master control manipulator movement results in a relatively small manipulator movement. This could be useful when the user desires a precise movement or finer control over the manipulator. In still another aspect, the proportional position relationship between the master control manipulator and the manipulator can comprise a relationship where a small master control manipulator movement results in a relatively large manipulator movement. This could be useful when the user desires a gross movement to rapidly move the manipulator without excess or unnecessary movement by the user. Other operating modes may include force reflection, gravity compensation, and torque assistance, such as further detailed in U.S. patent application Ser. No. 13/332,165 filed Dec. 20, 2011 ("Tele-operated Robotic System"), which is incorporated by reference herein.

The master control system 102 can further comprise a drive input device, which can be at least one joy stick 207, for controlling the speed and direction of the selected first and/or second robotic systems 104a and/or 104b moving about the ground surface, as further detailed below. Alternatively, a drive input device can comprise a pair of pedals 209 operable by the user's feet for controlling the speed and direction of the selected first and/or second robotic systems 104a and/or 104b about the ground surface (i.e., each pedal can control a track of a pair of tracks of a selected mobile platform, or a set of wheels, or other component of a mobility mechanism). In another example, a pair of joysticks can be incorporated (e.g., FIG. 13) and grasped by the user's hands for controlling locomotion of respective first and second robotic systems 104a and 104b in a coordinated manner when operating in the paired control mode for paired control of the first and second robotic systems 104a and 104b, as further detailed below. Note that, as defined above, a particular mobility mechanism can incorporate other components than tracks or wheels to be suitable for movement in any environment, such as propellers, thrusters, water jets, etc. for movement within a land, air, sea, and/or space type of environment.

It should be appreciated by those skilled in the art that other master robotic systems are incorporable herein for controlling two or more robotic systems discussed herein (other than the described exoskeleton-based master robotic system 102). For instance, a master robotic system can include, but is not limited to, replica-based control, accelerometer-based control, a brake-based control, an end point control-based control, and/or others, which are not be discussed in detail herein.

With continued reference to FIGS. 1-2, FIGS. 5-9 show various aspects of the systems and operating modes associated with the robotic system 100 discussed above. Although not discussed above, the robotic system 100 can further comprise one or more stabilizing robotic systems (i.e., vehicles) (see stabilizing robotic system 104c) operable with either or both of the first and second robotic systems 104a and 104b to provide stability for these, particularly when paired together to define or further define the unified robotic vehicle system. In one example, the one or more stabilizing robotic system(s) 104c can comprise a mobility mechanism 110c for facilitating; the moving of the stabilizing robotic system 104c about a ground or other surface within an environment. Furthermore, the robotic vehicle control module (see FIG. 6), discussed below, is operable in a paired control mode to facilitate paired control of at least one of the first or second robotic vehicles and the stabilizing robotic vehicle so as to define a unified robotic vehicle system operable to move about the ground surface under user control, wherein the robotic vehicle control module, also discussed below, is switchable to an unpaired control mode to facilitate unpaired control of movement of at least one of the first robotic vehicle or the second robotic vehicle or the stabilizing robotic vehicle independent of one another. The purpose and function of the stabilizing robotic system 104*c* is not to support a robotic manipulator, such as a robotic arm, as do the first and second robotic systems 104*a* and 104*b*. Rather, the stabilizing robotic system 104*c* can be designed and configured to provide a stabilizing function once paired with either of the first and/or second robotic systems 104*a* and/or 104*b*, such as during the performing of a task. Indeed, the stabilizing robotic system 104*c* can comprise similar components as the first and second robotic systems 104*a* and 104*b*, such as a mobility mechanism, a coupling mechanism, various position or other sensors, a radio, and any other operational components as described herein. Moreover, the stabilizing robotic system 104*c* can be operated and controlled in a similar manner as the first and second robotic systems 104*a* and 104*b*, as taught herein.

Figure 5:
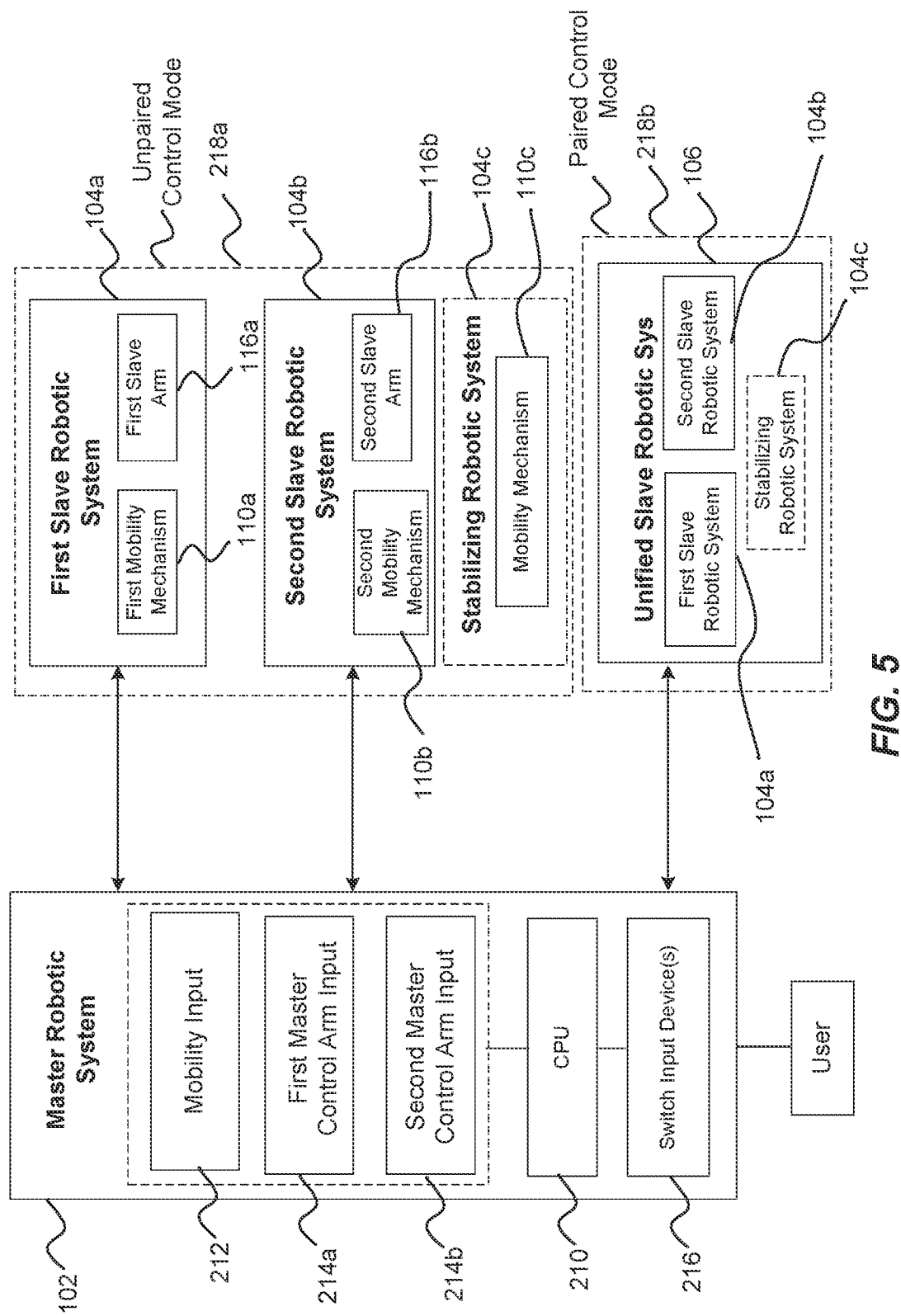
FIG. 5 illustrates a high level block diagram of a master robotic system, such as the master robotic system of FIG. 2, the master robotic system operable to switch between paired and unpaired control modes for controlling first and/or second robotic systems, such as the first and second robotic systems of FIG. 1, and/or a stabilizing robotic system, in accordance with one exemplary embodiment.

More specifically, FIG. 5 is a block diagram illustrating a high-level control scheme that includes aspects of the master robotic system 102 (or other type of master robotic control system discussed herein) that includes one or more CPU(s) 210 for receiving input signals, processing information, executing instructions, and transmitting output signals for controlling the first and second robotic systems 104*a* and 104*b*. For instance, the CPU(s) 210 can receive and process mobility input(s) 212 in response to user control of one or more drive input devices (e.g., see drive input devices 207, 209 shown in FIG. 2) to control operation of the selected first and/or second mobility mechanisms 110*a* and/or 110*b* for locomotion. Similarly, the CPU(s) 210 can receive and process a first master control manipulator input 214*a*, and/or a second master control manipulator input 214*b*, in response to user control of one or both master control manipulators 204*a* and/or 204*b* (e.g., control manipulator input devices) to control operating of the selected first and/or second manipulators 116*a* and/or 116*b*. These "inputs" (i.e., 212, 214*a*, 214*b*) may be transmitted to the CPU(s) 210 as output signals provided by sensor(s) (e.g., force sensors, position sensors) of the master robotic system 102 that detect user movement via the upper body exoskeleton structure 205 and the drive input device(s), for instance. The CPU(s) 210 can receive and process such sensor outputs, and then generate command signals that are transmitted to the first robotic system 104*a*, the second robotic system 104*b*, the stabilizing robotic system 104*c*, or any combination of these, for operation thereof. A radio (or other wireless communication device) may be coupled to the CPU(s) 210 for transmitting such command data to radios (FIG. 6) on the first and second robotic systems 104*a* and 104*b*.

Notably, the master robotic system 102 can comprise one or more switch input(s) 216 communicatively coupled to the CPU(s) 210 and operable by the user to selectively switch between modes for operating aspects of the first and second robotic systems 104*a* and 104*b* and the stabilizing robotic system 104*c*. For instance, the switch input(s) 216 can be in the form of one or more devices, such as a manual switch on one of the master robotic manipulators (204*a* or 204*b*), such as a mechanical or digital switch or button, etc., or even an audio switch controllable by the user's voice that operates the switch on voice commands. The switch input 216 can be selected to operate in an unpaired control mode 218*a*, whereby the user selects operational control over the first or second robotic systems 104*a* or 104*b* or the stabilizing robotic system 104*c*. Thus, the user can selectively operate the second master manipulator 204*b* of the master robotic system 102 to control the second manipulator 116*b* of the second robotic system 104*b*, and concurrently (or separately) the user can operate the drive input device (e.g., 207, 209) to control the second mobility mechanism 110*a* (e.g., the pair of tracks 112*c* and 112*d*), via the switch input(s) 216. Once the first robotic system 104*a* is in a desired location (and/or after performing a task), the user can then activate the switch input 216 to selectively operate the first robotic system 104*a* in a similar manner to position it in a desired location (and/or to perform a task).

After, or in the alternative to, separately operating the first and second robotic systems 104*a* and 104*b* and/or the stabilizing robotic system 104*c* (see e.g., FIG. 4) in the unpaired control mode 218*a*, the user can then activate the switch input 216 to switch from the unpaired control mode 218*a* to a paired control mode 218*b* to facilitate operating the first robotic system 104*a* with the second robotic system 104*b*, or the first robotic system 104*a* with the stabilizing robotic system 104*c*, or the second robotic system 104*b* with the stabilizing robotic system 104*c*, or the first robotic system 104*a* with both the second robotic system 104*b* and the stabilizing robotic system 104*c*, in a coordinated or harmonized manner. When operating in this paired control mode 218*b*, in one example, any two or more of the first and second robotic systems 104*a* and 104*b* and the stabilizing robotic system 104*c* can define the unified robotic system 106, such that the selected combination of robotic systems can be moved as one unitary or single mobile platform. In other words, one aspect of the paired mode facilitates operation of two or more of the first and second robotic systems 104*a* and 104*b* and the stabilizing robotic system 104*c* together as if they were a single robotic system. And, when in the paired control mode 218*b*, the user can concurrently operate the first and second master manipulators 204*a* and 204*b* to control respective first and second manipulators 116*a* and 116*b* and/or the stabilizing robotic system 104*c*, and concurrently (or separately) the user can operate one or more drive input device(s) (e.g., 207, 209) to control the first and second mobility mechanisms 110*a* and 110*b* to control locomotion of the first and second robotic systems 104*a* and 104*b*, or the mobility mechanism 110*c*; of the stabilizing robotic system 104*c*, in a coordinated manner. Examples of the control and coordinated movement of the first and second robotic systems 104*a* and 104*b* are further discussed below regarding FIGS. 10-13. One skilled in the art will recognize that the principles discussed below with respect to FIGS. 10-13 are applicable to any number of robotic systems paired together (e.g., the first and second robotic systems 104*a* and 104*b* being paired and operable with the stabilizing robotic system 104*c*), and that the below discussion relating to the control and operation of just the first and second robotic systems 104*a* and 104*b* is not meant to be limiting in any way.

Figure 3:
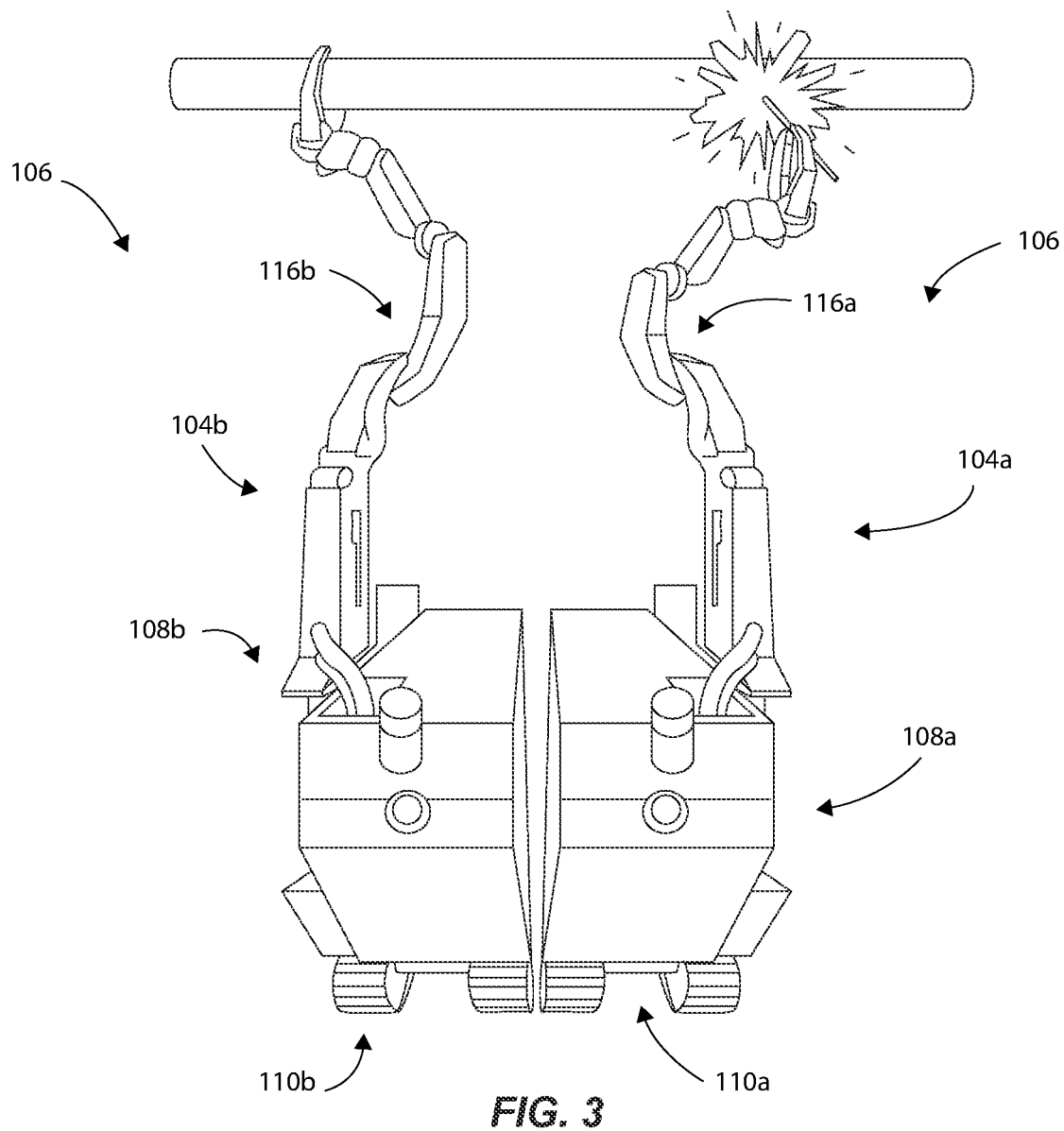
FIG. 3 illustrates the first and second robotic systems of FIG. 1 performing a task as tele-operated by a user operating a master robotic system, such as in FIG. 2.
Figure 4:
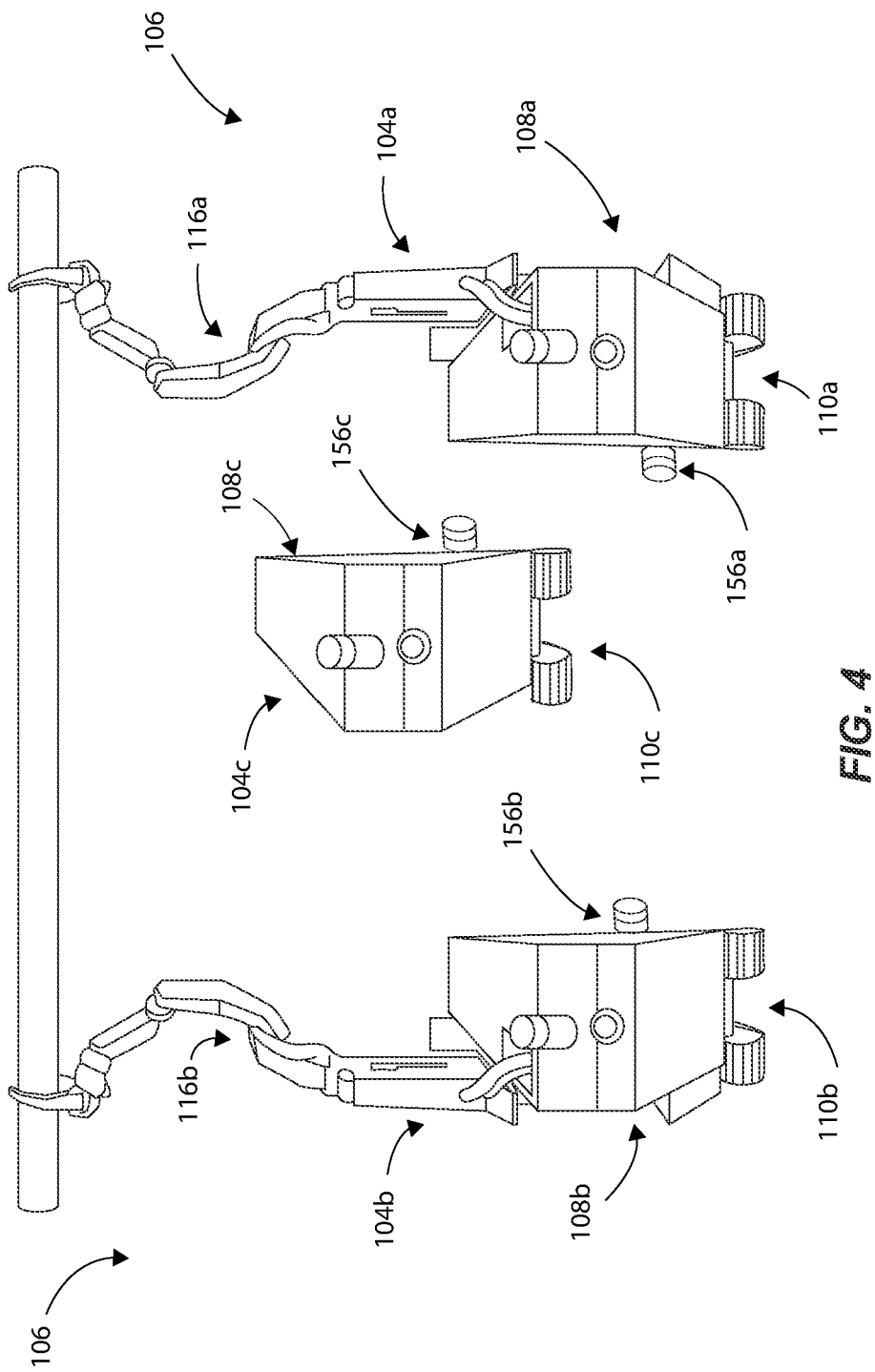
FIG. 4 illustrates the first and second robotic systems of FIG. 1 separated from each other and performing a task as tele-operated by a user operating a master robotic system, such as in FIG. 2.

FIGS. 3 and 4 illustrate two different examples of operating the unified robotic system 106 in the paired control mode 218*b* to perform respective tasks. Specifically, FIG. 3 shows the first and second mobile platforms 108*a* and 108*b* of the first and second robotic systems 104*a* and 104*b* being in close proximity or adjacent each other in a side-by-side manner, while the second manipulator 116*b* supports a pipe and the first manipulator 116*a* performs a task on the pipe (e.g., a welding task), thus providing multiple points of powered assisted manipulation as it relates to the pipe. The first and second mobile platforms 108*a* and 108*b* (and/or the stabilizing robotic system 104*c*) can be initially physically, and temporarily, coupled to each other by coupling mechanisms, as further exemplified below. As should be appreciated, the user can operate the first and second mobile platforms 108a and 108b in the paired control mode 218b to properly position their respective platforms and robotic manipulators into the view shown. Alternatively, the user can operate the first and second mobile platforms 108a and 108b in the unpaired control mode 218a to individually position their respective platforms and robotic manipulators into desired positions, and then switch to the paired control mode 218b to perform the task.

Similarly, FIG. 4 shows the first and second mobile platforms 108a and 108b of the first and second robotic systems 104a and 104h being remotely located or separated from each other by a distance (e.g., 8 feet), while the first and second manipulators 116a and 116b grasp and support a relatively long pipe (e.g., 14 feet), again providing multiple points of powered assisted manipulation as it relates to the pipe. As will be explained in greater detail below, advantageously, the user, controlling the exoskeleton structure 205 (for instance) (the master control system), can operate the first and second mobile platforms 108a and 108b in the paired control mode 218b (FIG. 5) to move the pipe around in a more stable manner than would otherwise be possible with a single robot holding the pipe with one or two manipulators, for instance. This is advantageous because the first and second robotic systems 104a and 104b can be cooperatively controlled and operated to lift and move a long, heavy object that may otherwise be inaccessible or unwieldy to lift and move with traditional systems of a single robotic manipulator (or a larger robotic system having two manipulators supported about one mobile platform). And, because the robotic systems 104a and 104b can be dynamically positioned at given distances from each other (e.g., 8-20 feet or more) and the unified robotic system 6 with the first and second robotic systems 104a and 104b still controlled as a single unit in the paired mode, the unified robotic system 6 with its robotic systems 104a and 104b have more flexibility than prior systems to accommodate supporting a particular object, while providing greater stability for supporting and moving it as desired.

Notably, as also discussed above, FIG. 4 illustrates an example of a stabilizing robotic system or vehicle 104c comprising a third mobile platform 108c having a third mobility mechanism 110c (e.g., tracks) for moving the stabilizing robotic vehicle 104c about a ground surface. It should be appreciated that the third mobile platform 108c can comprise the same or similar components and functionality as the first or second mobile platforms 108a and 108b. The third robotic platform 108c can support one or more manipulators, end effectors, and/or sensors, etc. In one example, the third robotic platform 108c can comprise a coupling mechanism 156c (as discussed herein) operable to physically couple to a coupling mechanism 156a of the first mobile platform 108c for providing enhanced or greater ground or other surface support stability to the first mobile platform 108a (as compared to the stability of the first mobile platform operating on its own and without being coupled or attached to anything). Note that the second mobile platform 108b can also comprise a coupling mechanism 156b (as described herein) for physically coupling to the first mobile platform 108a or the stabilizing robotic vehicle 104c. The coupling mechanisms of FIG. 4 are shown generically or schematically, but they could comprise any of the types of physical or virtual coupling mechanisms described herein. In some examples, numerous coupling mechanisms can be mounted to any side of a particular mobile platform for coupling to another coupling mechanism of another mobile platform. And, in one example, an end effector of a manipulator could be used as a coupling mechanism to couple together or attach to another mobile platform for stability purposes described herein. In some examples, three or more robotic systems or vehicles can be attachable together in a side-by-side manner via coupling mechanisms, and/or can be attachable together in a matrix or block (e.g., 2×2), and/or can be attachable lengthwise in a snake-like manner (e.g., using rotatable or pivotable coupling mechanisms to provide at least one degree of freedom of movement between mobile platforms).

Figure 6:
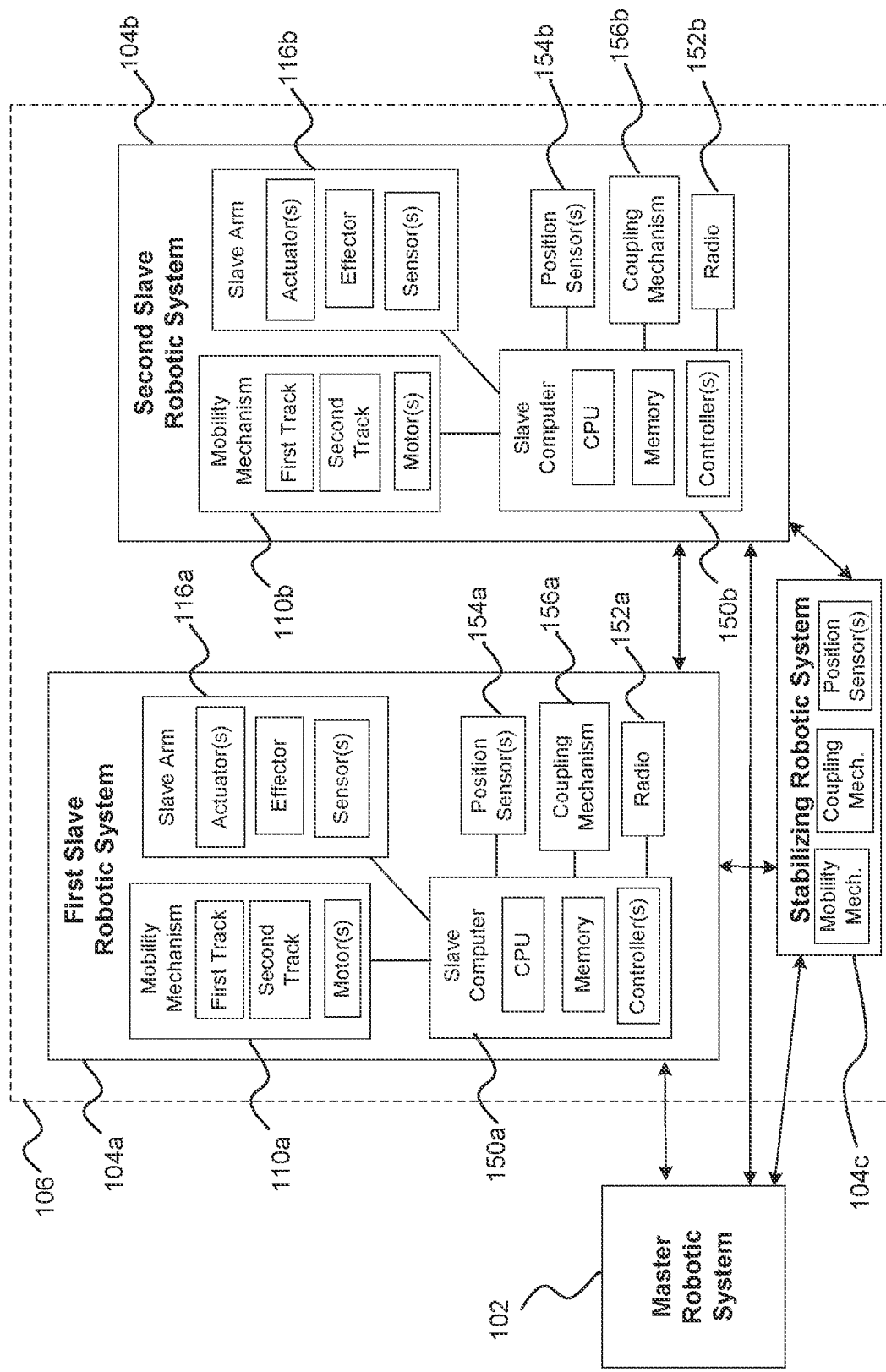
FIG. 6 illustrates a detailed block diagram of the various components and systems of the first and second robotic systems of FIG. 1, in accordance with one exemplary embodiment.

FIG. 6 shows a block diagram of further details and aspects of the first and second robotic systems 104a and 104b (and the stabilizing robotic system 104c) in accordance with an example of the present disclosure. Each mobility mechanism 110a and 110b (and 110c of the stabilizing robotic system 104c) can comprise first and second tracks, and motor(s) for driving the tracks. Each manipulator 116a and 116b can comprise a number of actuators for actuating respective joints of the manipulators. The actuators can be linear or rotary actuators, and can be operated by electricity, hydraulics, pneumatics, or a combination of these. Each manipulator 116a and 116h can further comprise an end effector (e.g., gripper, magnet, scanner, etc.) and sensor(s) (e.g., position, force) for sensing information (e.g., position, force) associated with each joint of each manipulator 116a and 116b. Various other sensors of various types can be located about each of the first and second robotic systems 104a and 104b. Each of the first and second robotic systems 104a and 104h can further comprise a computer 150a and 150b coupled to the respective mobility mechanisms 110a and 110b and to respective manipulators 116a and 116b. Each computer 150a and 150b can include CPU(s), memory, and controller(s) for controlling operation of respective mobility mechanisms 110a and 110b and first and second robotic systems 104a and 104b, and communication/network components for communicating within a network. A similar computer can be supported on the stabilizing robotic system 104c for controlling the mobility mechanism of the stabilizing robotic system 104c.

The first and second robotic systems 104a and 104b can further comprise transceiver radios 152a and 152b coupled to the respective computers 150a and 150b for receiving and sending signals between each other, and between the master robotic system 102. The radios can be part of a network, which may include any useful computing or signal network, including an intranet, the Internet, a local area network (LAN), a wide area network (WAN), a wireless data network, a cell network, a direct RF link, a stateless relay network or any other such network or combination thereof, and may utilize a variety of protocols for transmission thereon, including for example, Internet Protocol (IP), the transmission control protocol (TCP), user datagram protocol (UDP) and other networking protocols. Components utilized for such a system may depend at least in part upon the type of network and/or environment selected. Communication over the network may be enabled by wired, fiber optic, or wireless connections and combinations thereof. A similar radio can be supported on the stabilizing robotic system 104c.

Each of the first and second robotic systems 104a and 104b can further comprise one or more vehicle position sensors 154a and 154b (e.g., position location sensors) coupled to the respective computer 150a and 150b) for sensing and determining the relative spatial positions (and orientation) of the first and second mobile platforms 108a and 108b relative to each other. The vehicle position sensors 154a and 154b can comprise one or more of GPS devices. Visual Inertial Odometry technology (using cameras), MD technology, Inertial Measurement Units, and others. The vehicle position sensors 154a and 154b can be useful in determining the distance between the first and second robotic systems 104a and 104b for controlling their relative positions, as further detailed below. Similar sensors can be supported on the stabilizing robotic system 104c. The position sensors discussed herein can comprise position location sensors used for determining an absolute orientation of a particular mobile platform, and thereby for determining a relative orientation of two or more mobile platforms relative to each other, as further discussed below.

Each of the first and second robotic systems 104a and 104b (and/or the stabilizing robotic system 104c) can further comprise a platform coupling system or mechanism (such as platform coupling mechanisms 156a and 156b) coupled to the respective first and second mobile platforms 108a and 108b (and/or the stabilizing robotic system 104c) for physically, coupling together the first and second mobile platforms 108a and 108b (and/or the stabilizing robotic system 104c) when operating in the paired control mode (see also FIG. 10). In one example, each coupling mechanism 156a and 156h can comprise a magnet (e.g., an electromagnet) supported by the respective mobile platforms 108a and 108b, that are attractable to each other to physically couple the mobile platforms 108a and 108b together when in close proximity. In the case of an electromagnet, this can be operatively in communication with the computer and selectively operated to couple or uncouple the mobile platforms 108a and 108b. In one example, the electromagnet can be controlled by the user operating a platform coupling input device (e.g., button) that facilitates activation and deactivation of the electromagnet. Other platform coupling mechanisms are contemplated herein, such as a ball-and-socket, hook and loop, and other mechanical couplers that can be operable to couple and decouple the first and second mobile platforms. In some examples, a coupling mechanism may not be needed, because the first and second mobile platforms can be operated in-synch when adjacent each other without being physically coupled, and can therefore be "virtually coupled", as further detailed below. A similar coupling system, namely a physical coupling system, can be supported on the stabilizing robotic system 104c that facilitates coupling of the stabilizing robotic system 104c to one or both of the first and second robotic systems 104a and 104h.

Figure 7:
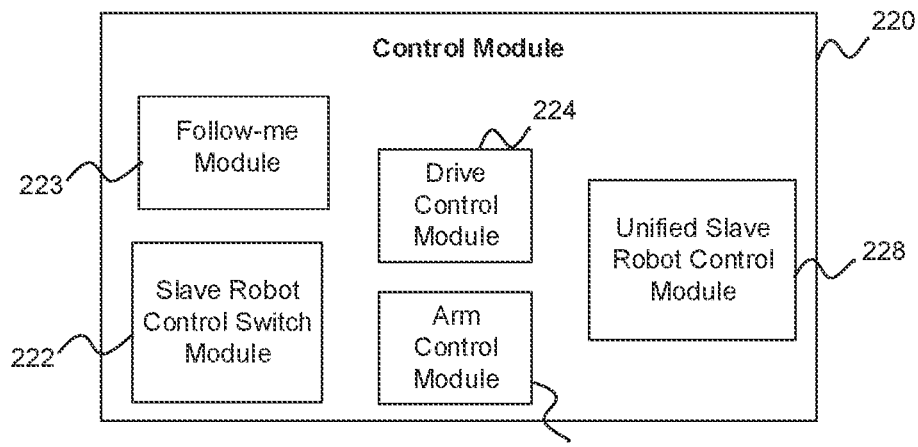
FIG. 7 illustrates a block diagram of a control module or system for operating the components and systems of the first and second robotic systems, and the master robotic system of FIGS. 1-6, in accordance with one exemplary embodiment.
Figure 8:
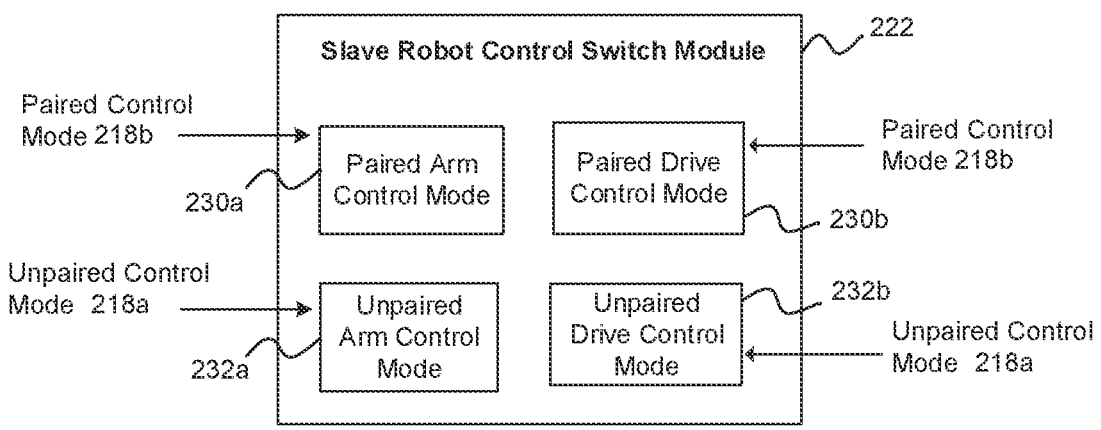
FIG. 8 illustrates a block diagram of a robot control switch system or module for facilitating switching between different modes of operation for operating the first and second robotic systems of FIGS. 1-6, in accordance with one exemplary embodiment.
Figure 9:
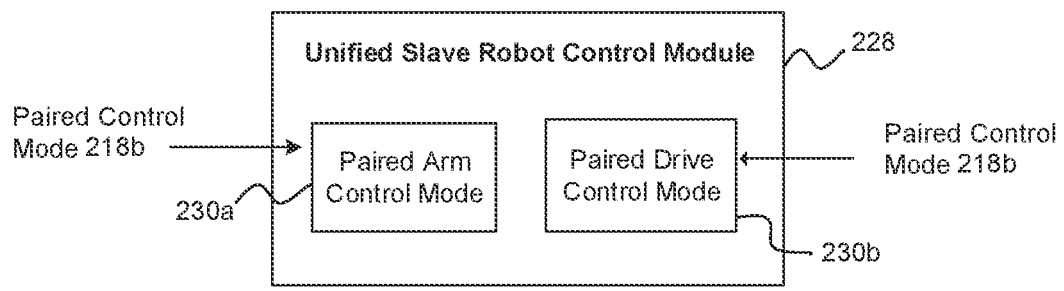
FIG. 9 illustrates a block diagram of a unified robot control module or system for facilitating controlling the first and second robotic systems of FIGS. 1-6 when in the paired control mode, in accordance with one exemplary embodiment.

With reference to FIGS. 7-9, the robotic system 100 can further comprise a control module 220 associated with the master robotic system 102 and the first and second robotic systems 104a and 104b. As an overview, as noted above the control module 220 can be operable in the paired control mode 218b to facilitate paired control of the first and second robotic systems 104a and 104b (that define the unified robotic system 106) to move the unified robotic system 106 about the ground surface or other environment. The control module 220 is further operable in (i.e., switchable to) an unpaired control mode 218a to facilitate non-paired or unpaired control of a selected one of the first or second robotic systems 104a or 104b.

More specifically, the control module 220 can comprise some or all of the mechanical features and systems of the master robotic system 102 described above and shown in FIGS. 1-6, as well as software running or installed for execution by the CPU(s) (CPU(s) of the master robotic system 102, the first and second robotic systems 104a and 104b, or both) for facilitating operation of the first and second robotic systems 104a and 104b. The software can be operable to run on a tangible and non-transitory computer readable medium and can be configured to direct one or more processors to execute instructions to cause activation or actuation of components of the first and second robotic systems 104a and 104b and one or more stabilizing robotic systems 104c (e.g., mobility mechanisms, manipulators, coupling mechanisms, radios, etc.). Thus, the control module 220 can comprise a combination of software and mechanical devices/systems associated with the master robotic system 102 and the first and second robotic systems 104a and 104b, as further detailed regarding FIG. 6.

In the example of FIG. 7, the control module 220 can comprise or include a robot control switch module 222 (or more generally a "robotic vehicle control switch module"), a drive control module 224, a manipulator control module 226, a unified robot control module 228 (or unified robotic vehicle control module), and a follow-me module 223.

The robot control switch module 222 can include a combination of software and mechanical devices/systems, such as software processed by the CPU(s) of the master robotic system 102 (FIG. 5), software processed by the CPUs of the first and second robotic systems 104a and 104b (FIG. 6), the switch input(s) 216 (FIG. 5), and various aspects of the first and second robotic systems 104a and 104b and the stabilizing robotic system 104c (FIG. 6) (i.e., computers, mobility mechanisms, manipulators, coupling mechanisms), as further detailed below.

The drive control module 224 can include a combination of software and mechanical devices for facilitating locomotion or drive of the mobile platforms 108a and 108b of the respective first and second robotic systems 104a and 104b, as well as for the stabilizing robotic system 104c, such as software processed by the CPU(s) of the master robotic system 102 (FIG. 5), software processed by the CPUs of the first and second robotic systems 104a and 104b and the stabilizing robotic system 104c (FIG. 6), the drive input devices (FIG. 2), the mobility input(s) 212 (FIG. 5), a user interface, and various aspects of the first and second robotic systems 104a and 104b and the stabilizing robotic system 104c (FIG. 6) (i.e., computers, mobility mechanisms) in place to effectuate locomotion.

The manipulator control module 226 can include a combination of software and mechanical devices for facilitating movement and operation of the manipulators 116a and 116b of the respective first and second robotic systems 104a and 104b, such as software processed by the CPU(s) of the master robotic system 102 (FIG. 5), software processed by the CPUs of the first and second robotic systems 104a and 104b (FIG. 6), master control manipulators 204a and 204b (FIG. 2), master control manipulator inputs 214a and 214b (FIG. 5), a user interface and various aspects of the first and second robotic systems 104a and 104b (FIG. 6) (i.e., computers, manipulators).

The robot control switch module 222 (further detailed in FIG. 8) can facilitate operation of the first and second robotic systems 104a and 104b and the stabilizing robotic system 104c in the paired control mode 218b, which includes a paired manipulator control mode 230a and a paired drive control mode 230b. In one aspect, the user can activate, via a user interface, a switch input (e.g., 216 of FIG. 5) as part of the robot control switch module 222 to select both of the first and second manipulators 116a and 116b to be operated by the user (via the master manipulators 204a and 204b) to operate in a coordinated manner to perform a task (e.g., see FIGS. 3, 4, and 15), as also detailed above. The user can further activate the switch input (e.g., 216 of FIG. 5) to select both of the first and second mobile platforms 110a and 110b) and the stabilizing robotic system 104c to be operated by the user (e.g., via mobility input via joystick 207) to operate/move in a coordinated manner about a ground surface as a single, movable robotic platform, as further detailed herein. Note that such selective activation and operation of the manipulators 116a and 116h and the mobile platforms 108a and 108b and the stabilizing robotic system 104c in the paired control mode are not dependent on each other, and can be selected separately by the user depending on the particular task.

The robot control switch module 222 can further facilitate operation of the first and second robotic systems 104a and 104b and the stabilizing robotic system 104c in the unpaired control mode 218a, which includes an unpaired manipulator control mode 232a and an unpaired drive control mode 232b. In one aspect, the user can activate, via a user interface, a switch input (e.g., 216 of FIG. 5) as part of the robot control switch module 222 to select the first and second manipulators 116a and 116b to be operated by the user (via the master manipulators 204a and 204b) to operate separately to perform separate tasks (e.g., see FIG. 17), as further detailed above. The user can further activate a switch input (e.g., 216 of FIG. 5) to select which of the first and second mobile platforms 108a or 108b and/or the stabilizing robotic system 104c to be operated by the user (e.g., via mobility input via joystick 207) to be independently operated/moved about a ground surface, as further detailed above.

It is noted that such selective activation and operation of the manipulators 116a and 116b and the mobile platforms 108a and 108b and the stabilizing robotic system 104c in the unpaired control mode 218a are not dependent on each other, and therefore these can be selected separately depending on the particular task. It is further noted that one aspect of the unpaired control mode 218a can be selected (by the user) and combined with an aspect of the paired control mode 218b. For example, the user can choose to move the mobile platforms 108a and 108b and the stabilizing robotic system 104c independently in the unpaired control mode 218a, while operating the manipulators 116a and 116b in the paired manipulator control mode 230a to perform a common task with the manipulators 116a and 116b, but not necessarily synching and operating together the mobile platforms 108a and 108b or the stabilizing robotic system 104c, although this is also contemplated. An example of this is graphically illustrated in FIG. 15, where the manipulators 116a and 116b are lifting an object in a coordinated manner, while the mobile platforms 108a and 108b are not necessarily moving or operating in a coordinated manner. In this aspect, the user can select which mobile platform 108a or 108b to move about the ground surface at different times, which may be necessary for more complicated, coordinated tasks with the manipulators 116a and 116b.

With further reference to FIG. 9, the unified robot control module 228 of the control module 220 can facilitate operation of the first and second robotic systems 104a and 104h and the stabilizing robotic system 104c in the paired manipulator control mode 230a and the paired drive control mode 230b. This is an example of when the first and second robotic systems 104a and 104b, and optionally the stabilizing robotic system 104c, are defining the unified robotic system 106 in which both of the manipulators 116a and 116b and both of the mobile platforms 108a and 108b and the stabilizing robotic system 104c, if present, operate in the paired control mode 218b via user operation of the master control system 102.

FIGS. 10-12 schematically illustrate user control of first and second robotic systems 304a and 304b (e.g., 104a and 104b), that define a unified robotic system 306 (e.g., 106), and in a top-down view of the first and second robotic systems 304a and 304b operably controlled by a user via a master robotic system 302 (e.g., 102). The master robotic system 302 can be the same or similar as the master robotic system 102 described above, including comprising a drive input device 307 for controlling movement of the unified robotic system 306. For instance, the drive input device 307 can comprise a joystick operable by the user in the x-y axes to control forward/backward and left/tight ground movement of the unified robotic system 306, as illustrated by the directional arrows within the box representing drive input device 307. Although not specifically shown here, it is contemplated that the first and second robotic systems 304a and 304h can further be operable with a stabilizing robotic system as discussed herein, which stabilizing robotic system can be employed for the purpose of stabilizing either of the first or second robotic systems 304a or 304b, or both, such as while in the paired mode, and which can separate from the first or second robotic systems 304a or 304b, such as when in the unpaired mode.

Similarly as exemplified above with respect to the first robotic system 104a, the first robotic system 304a can comprise a first mobile platform 308a supporting a first manipulator 316a and a first pair of tracks 312a and 312b (e.g., continuous tracks) that facilitate locomotion. The first mobile platform 308a can support a coupling mechanism 356a (e.g., 156a) and a position sensor 354a (e.g., 154a). Similarly as exemplified above, the second robotic system 304h can comprise a second mobile platform 308b supporting a second manipulator 316b and a second pair of tracks 312c and 312d (e.g., continuous tracks) that facilitate locomotion, and supporting a coupling mechanism 356b (e.g., 156b) and a position sensor 354b (e.g., 154b). As further detailed above; the positions sensors 356a and 356b operate to generate and provide position data (i.e., position sensor output data) associated with the respective positions of the first and second robotic systems 304a and 304b relative to each other. The position sensors, as position location sensors in one example, can also operate to generate orientation output data associated with the absolute orientation of a mobile platform (i.e., its orientation in three dimensional space), and which can be processed to determine the orientation of two or more mobile platforms relative to each other in three dimensions. Thus, the position sensors can be used to generate position and orientation data for the processor to determine the distance between two or more mobile platforms, and their relative orientation in space. This position data generated by the position sensors 356a and 356b can be transmitted to and received by the CPU of the master robotic system 302 for processing to determine a first distance D1 between the first and second mobile platforms 308a and 308b, for instance (and also to determine their absolute and relative orientation in three dimensions). If the user desires the first distance D1 to be the minimum distance so that the mobile platforms 308a and 308b are near or adjacent each other (e.g., less than a foot apart, as illustrated in FIG. 1), the user can either individually move the mobile platforms 308a and 308b to the desired distance D1, or, alternatively, the user can activate an input device (e.g., button on the joystick) to cause the mobile platforms 308a and 308b to autonomously move adjacent each other to the desired first distance D1 (and spatial position/orientation) relative to each other, or other pre-programmed distance and orientation. Thus, the robot control switch module 222 is operable in an autonomous pairing mode that facilitates the first and second mobile platforms 310a and 310b autonomously moving to a paired position/orientation (FIG. 10) relative to each other based on the position data generated by the position sensors 354a and 354b. For instance, a paired position may be programed as meaning the first and second mobile platforms 308a and 308b should be moved to be 10 feet apart and oriented in the same direction in space. Then, in response to the user selecting the programmed paired position via a switch input, the autonomous pairing module transmits command signals to the first and second mobile platforms 308a and 308b to move to the desired paired position/orientation. Any number of possible paired positions and orientations can be programmed into the master control system 302, and/or the user can select a desired distance and orientation of the first and second mobile platforms 308a and 308b, and then the master control system 302 can cause the first and second mobile platforms 308a and 308b to autonomously move to the selected distance and orientation relative to each other, in one example.

Note that the master control systems contemplated herein can operate aspect(s) of two or more robotic systems in an autonomous mode, a semi-autonomous mode, and/or a supervised autonomous mode for control of at least one function of at least one of the first or second robotic mobile platforms. For instance, a master control system can be pre-programmed to cause autonomous movements of the first and/or second robotic systems to perform certain tasks in the autonomous mode (e.g., repetitive tasks of lifting and stacking objects). Furthermore, in the autonomous mode a particular master control system can be "smart", meaning that the first and/or second mobile platforms can sense (and/or know) their surroundings, such as the ground, objects, walls, facilities, personnel, etc. and act accordingly to achieve a certain task. Such implementation would require a number of sensors/cameras on each mobile platform that can sense the surroundings, and then a master control system (e.g., on-board the mobile platform(s)) can, based on the sensed surroundings, effectuate autonomous movement of the mobile platform (and manipulator, etc.) to achieve a task in a fully autonomous manner (and/or in a semi-autonomous manner or mode). In a supervised autonomous mode, an individual can "supervise" the autonomous or semi-autonomous operations or movements of one or more robotic systems to ensure safe and effective operations thereof (e.g., the supervising individual can intervene and take control as needed for controlling one or more functions of a robotic system(s)).

As also detailed above, if desired and so equipped, the user can cause activation or operation of the first and second coupling mechanisms 356a and 356b (e.g., electromagnets) to physically couple together the mobile platforms 308a and 308b. Alternatively, the mobile platforms 304a and 304b may not be physically coupled together, but may be virtually coupled together via operation of the position sensors and mobility mechanisms, such that the mobility mechanisms are operable to move autonomously and to make small adjustments if they drift apart so they can maintain a close/desired position and orientation relative to each other while moving together about the ground surface. Thus, in one aspect, if one of the mobile platforms 308a or 308b begins to drift or move too far away from the other mobile platform, the CPU(s) of the master robotic system 302 will determine this based on the position data generated by the position sensors 354a and 354b, and then the CPU(s) of the master robotic system 302 can cause one or both of the mobile platforms 308a and/or 308b to move closer together to the desired paired position/orientation, thereby auto-correcting the distance between and orientation of the mobile platforms 308a and 308b so they maintain their close proximity to each other in the desired paired position/orientation. Although not shown, one or both of the first and second robotic systems 304a or 304b can further be physically or virtually coupled to a stabilizing robotic system in the same manner, with the stabilizing robotic system similarly comprising a coupling mechanism and various sensors to achieve this.

With continued reference to FIG. 1.1, the first and second mobile platforms 308a and 308b (defining, at least in part, the unified robotic system 306) can be positioned a second distance 132 (e.g., 8 feet) from each other while still being operated in the paired control mode by the control module (e.g., 220) of the master control system 302. That is, the user can operate a drive input device 307 to cause one of the first and second mobile platforms 308a or 308b to be moved to a desired position/orientation relative to the other mobile platform to be at the second distance D2, which can be achieved visually/manually by the user. Alternatively, the user can input the value of the second distance D2 via the master robotic system 302, and in response one or both of the first and second mobile platforms 308a or 308b can autonomously move to the desired positons illustrated in FIG. 11, therefore being the desired distance apart (e.g., D2) and situated laterally relative to each other, in one example.

Accordingly, whether the first and second mobile platforms 308a and 308b are separated by the first distance D1 or the second distance 132, the unified robotic system 306 can be operated to move about the ground surface by operation of the drive input device 307 operated by the user, so that the first and second mobile platforms 308a and 308b can be moved about the ground as a unitary movable platform.

With continued reference to FIG. 12, the first and second mobile platforms 308a, and 308b can be turned or moved together in a coordinated manner while being separated by a particular distance from each other. For instance, as shown the first and second mobile platforms 308a and 308b can be moved together to the right (clockwise) direction in a coordinated manner based on a differential calculation processed by the CPU(s) of the computer system of the master robotic system 302. The differential calculation is at least partially based on the sensed (or selected) distance D2 between the first and second mobile platforms 308a and 308h, so that the individual tracks (i.e., 112a-d) can be operated in a coordinated manner to effectuate a proper right hand turn with skid steering techniques, for instance, based on the position/orientation and the degree of turn of the unified robotic system 306. Thus, a gradient is determined along the tracks 312a-d based on the distances apart from each other, which provides a dynamic differential relative to the tracks 312a-d. In this way, the speed or velocity of each track can be dynamically (and autonomously) changed or modified based on the determined distance (e.g., D1, D2) between the mobile platforms 308a and 308b. Note that skid steering principles and calculation for a single mobile platform having a pair of tracks is well known and routine in the art, so such principles and calculations will not be discussed in detail herein. Therefore, depending on the distance between a pair of tracks (e.g., 312a and 312h), the length of the tracks, and other parameters, a person having ordinary skill in the art can readily calculate controls schemed for a single particular tracked mobile platform to drive forward, rearward, and turn based on the particular design of the paired-track mobile platform.

On the other hand, with respect to two separated robotic systems (e.g., robotic systems 304a and 304b) separated from one another by a distance D2, the mobile platforms 304a and 304b can be turned relative to a turning center point C1 indicated in FIG. 12, illustrating the center of the turning point at which the mobile platforms 304a and 304b collectively move and turn about when turning directly to right (i.e., zero point turn), for example. It should be appreciated that the point in space of this turning center point C1 may vary depending on the degree/radius of the turn of the mobile platforms 304a and 304b. Thus, when turning right about center point C1, track 312a will be controlled to move at a velocity that is greater than the velocity of track 312b, and which is greater than the velocity of track 312c, and which is greater than the velocity of track 312d (which may be a zero velocity).

In one example, the user can select a particular turning center point, such as turning center point C2 located laterally somewhere between the mobile platforms 304a and 304b. The turning center point C2 in this example can be, but is not required to be, at or near the midpoint between the mobile platforms 308a and 308b, such that the mobile platforms 304a and 304b can turn or spin relative to this turning center point C2. Accordingly, and based on the differential calculation and the location of the turning center point C2, track 312a may be controlled to move at a forward velocity that is greater than a forward velocity of track 312b, while track 312c may have a reverse velocity that is substantially the same as the velocity of track 312b, and while track 312d may have a reverse velocity that is substantially the same as the velocity of track 312a. Accordingly, the first and second mobile platforms 308a and 308b can move in a circle about turning center point C2. Note that turning center point C2 may be selected by the user to be closer to one of the mobile platforms, which can provide a customized turning point and resulting unified turn radius for a particular task.

In some examples, a second drive input device can be incorporated with the master robotic system 302, such as illustrated in FIG. 13, showing first and second drive input devices 307a and 307b that control the speed and direction of respective first and second mobile platforms 308a and 308b of the first and second robotic systems 304a and 304b. The first and second drive input devices 307a and 307b can be joysticks operable to control movement of the first and second mobile platforms 308a and 308b when in the paired control mode. This may be useful when the user has control over the turning point center of the mobile platforms 308a and 308b, such as described above. When the user switches to the unpaired control mode, the user may use one of the drive input devices 307a or 307b to control the selected one of the first or second robotic systems 304a or 304b.

Figure 14:
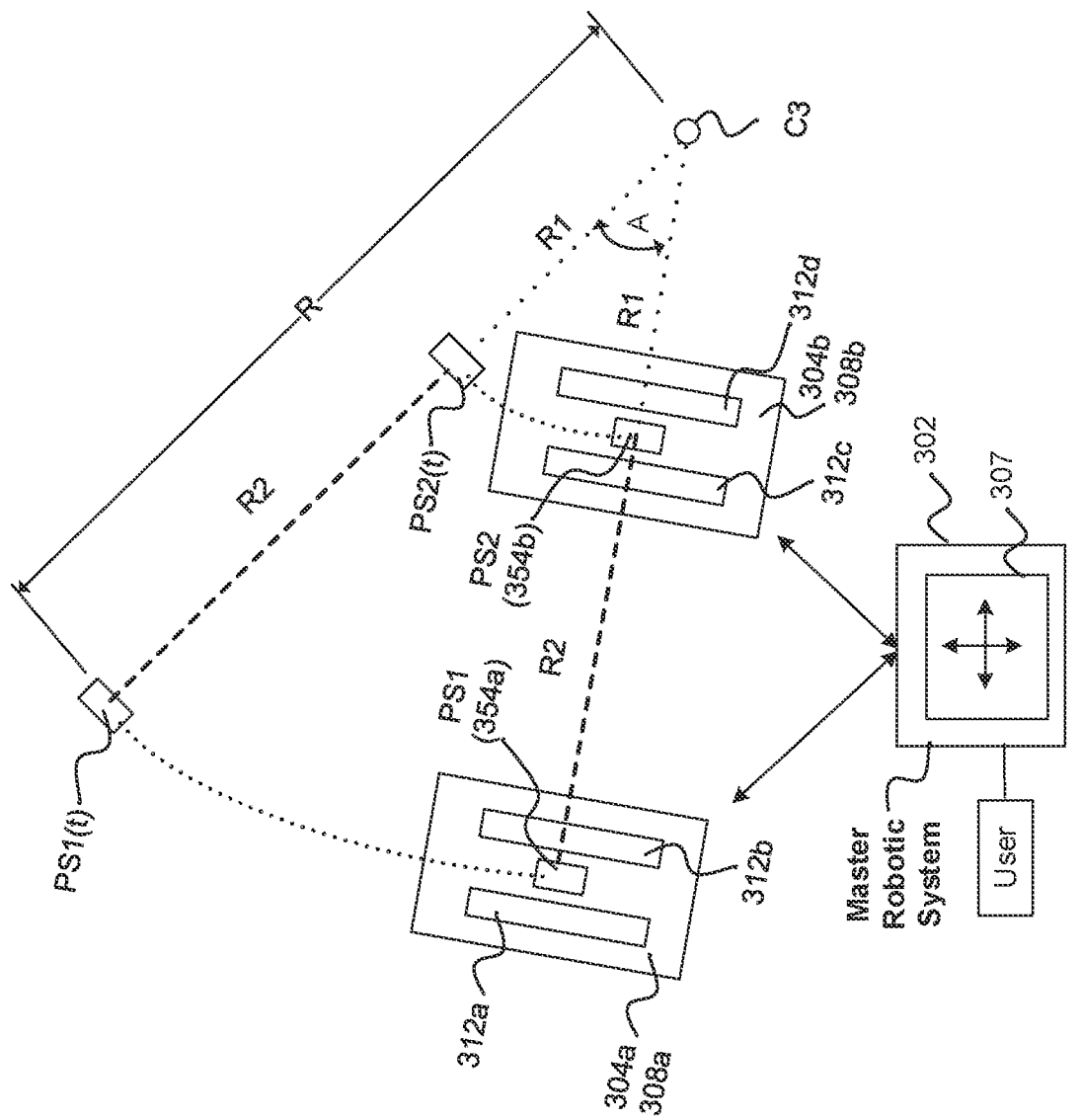
FIG. 14 schematically illustrates the first and second robotic systems of FIG. 1, illustrating mathematical relationships between the first and second robotic systems as they are turning while in the paired control mode.
Figure 15:
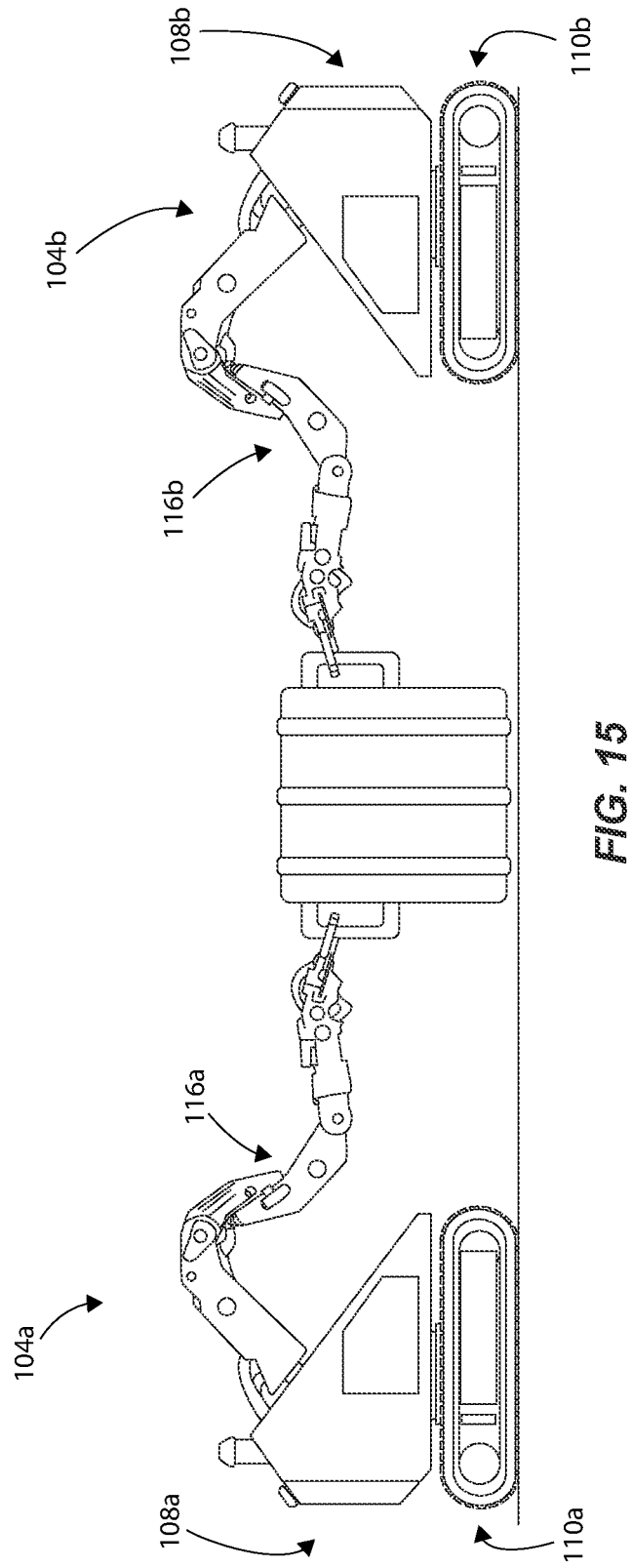
FIG. 15 illustrates the first and second robotic systems of FIG. 1 performing a coordinated task of lifting an object while the mobile platforms are separated from each other, in accordance with one exemplary embodiment.

FIG. 14 illustrates another example of controlling the first and second mobile platforms 308a and 308b in the paired control mode to turn or move them together in a coordinated manner while separated by a particular distance from each other. As noted above regarding FIG. 12, the first and second mobile platforms 308a and 308b can be moved together to the right (clockwise) direction in a coordinated manner based on a differential calculation processed by the CPU(s) of the computer system of the master robotic system 102. The differential calculation is at least partially based on the sensed (or selected) distance between the first and second mobile platforms 308a and 308b based on position information generated by position sensors PS1 and PS2 on respective mobile platforms 308a and 308b. In this way, the individual tracks 312a-d (e.g., 112a-d) can be operated in a coordinated manner to effectuate a proper right hand turn with skid steering techniques based on the position/orientation and the degree of turn of the unified robotic system 306.

The first and second mobile platforms 304a and 304b can be turned relative to an arbitrary turning center point C3, which can be located beyond or outside of the first and second mobile platforms 304a and 304h. The center point C3 illustrates the center of the turning point at which the mobile platforms 304a and 304b collectively move and turn. Note that the user can selected this turning center point C3, or it may be automatically selected by the master computer system based on programmed movements that the first and second mobile platforms 304a and 304b are required to perform for a particular task. Based on the turning center point C3, the second mobile platform 304b can have a turning radius R1, which can be calculated by the CPU(s) of the master control system 302 based on received position sensor data from the position sensor PS2 of the second mobile platform 304b. And, the first mobile platform 304a can have a turning radius R2 defined by the distance between the first and second mobile platforms 304a and 304b, as determined using position sensor information provided by the positions sensors PS1 and PS2 on the respective mobile platforms 304a and 304b. Note that FIG. 14 illustrates a second position in time for each of the first and second mobile platforms 304a and 304b after turning a particular degree, as illustrated by the respective positions sensors PS1(t) and PS2(t) at the end of the dashed lines of the turning arcs of each mobile platform 304a and 304b. Accordingly, the combination of R1+R2=R, where R is the turning radius for the first mobile platform 304a from the turning center point C3, and R1 is the turning radius for the second mobile platform 304a. Thus, the sweep of the first and second mobile platforms 308a and 308b is equal to the angle of rotation A over time.

For instance, based on the chosen location of the turning center point C3, the CPU(s) can use position and orientation information from position sensor PS2 to determine that the second robotic system 304b is 20 feet away from turning center point C3, and therefore R1=20 ft. The CPU(s) can then determine that R2=30 ft based on the distance between PS1 and PS2. Therefore, because R=20+=50 ft, the first robotic system 304a can be operated to turn about a 50 ft radius, while the second robotic system 304b can be operated to turn about a 20 ft radius. Based on this calculation performed by the CPU(s) of the master control system 302, the master control system 302 can transmit command signals to each of the first and second mobile platforms 308a and 308b to drive their respective tracks based on the calculated turning radius R and R1, respectively. This functionality performs or executes such movement of the first and second mobile platforms 308a and 308b actively through the above mathematical calculations to control the pairs of tracks of each of the first and second mobile platforms 308a and 308b.

In another example not shown, a third robotic system can be incorporated with first and second robotic systems described in the present disclosure. Here, three mobile platforms can be spatially or remoted separated from each other about a relatively long distances (e.g., 10 feet or more between each platform), while the three manipulators grab and move/manipulate a relatively long object in a coordinated manner. The three mobile platforms can then be moved via operation of one or more drive input devices (e.g., joystick(s)) by a user, and the user can select which of the three mobile platforms to control when in an unpaired control mode, such as when positioning each mobile platform relative to each other when preparing for a paired control mode to perform a coordinated task. In another example, four or more robotic systems can be controlled by a master robotic system, such as may be required for lifting and moving heavy or complex objects. As indicated above, any one or any combination or all of the robotic systems can be operable with one or more stabilizing robotic systems, as taught herein.

One advantage of providing separable robotic systems (e.g., 104a and 104b) and separable stabilizing robotic systems is the fact that one particular robotic system, or each of these, and any stabilizing robotic systems, can be selectively operated to travel through tight areas, such as through a particular doorway as illustrated in FIG. 16. Here, the lateral width of the first robotic system 104a can be relatively small (e.g., 42 inches or less) so that the mobile platform 108a can be driven through smaller access openings. This is advantageous in particular facilities where human presence may be prohibited, such as in radioactive environments. Moreover, the robotic systems and the stabilizing robotic systems can follow each other in a linear manner (i.e., end to end in a snakelike manner), such as through a tight doorway, and then they can be brought together side-by-side to be operated in the paired control mode.

In one example, the robotic systems and the stabilizing robotic systems can alternatively be considered robotic vehicles operable to move about a ground surface (via wheels or tracks), and the master robotic system can instead be a robotic vehicle control system (not necessarily a "master") for controlling the robotic vehicles movement along the ground. That is, in this example there is not necessarily a master-follower relationship, such as described above. For instance, first and second robotic vehicles and one or more stabilizing robotic vehicles can be operated in an unpaired control mode by a robotic vehicle control system (e.g., input devices, computer system, wireless communications, etc.) to facilitate unpaired control of a selected one of the first or second robotic vehicles or the one or more stabilizing robotic vehicles to move about a ground surface. The robotic vehicle control system, operated by a user, can then be operated to switch to a paired control mode for paired control of the first and second robotic vehicles and optionally the one or more stabilizing robotic vehicles to define a unified robotic vehicle system. Then, the robotic vehicle control system can operate the unified robotic vehicle system to move about the ground surface, in a similar manner as described above. It should be appreciated that, similarly as described above, a distance between the first and second robotic vehicles and the one or more stabilizing robotic vehicles can be determined by a processor (of the robotic vehicle control system) by receiving position sensor output data generated from one or more position sensors on each of the first and second robotic vehicles and the one or more stabilizing robotic vehicles. Based on the determined distance, the robotic vehicle control system is then operable by a user to control movement of the first and second robotic vehicles and the one or more stabilizing robotic vehicles in a coordinated manner, similarly as described above regarding controlling movement of two or more mobile platforms of robotic systems.

In one example of implementing three or more robotic vehicles, it should be appreciated that the same or similar principles discussed regarding FIGS. 10-14 could readily be incorporated for controlling three or more robotic vehicles. For instance, assume a stabilizing robotic vehicle (e.g., 104c), or other/third vehicle, is incorporated with the paired or coordinated control aspects described in FIG. 12. The distance between all three vehicles could be determined in a similar manner, and the three vehicles can still be operated in the "paired" control mode such that all three vehicles move in a coordinated manner. For instance, the middle vehicle (of a set of three vehicles) could be deemed positioned at the center turning point such that the vehicles on either side of the middle vehicle rotate around the middle vehicle (e.g., when all three vehicles are lifting and moving a common payload). As can be appreciated, the center turning point for three vehicles can be determined to be anywhere in space along the ground surface. Note that three or more vehicles need not necessarily all be controlled in a coordinated manner at the same time, depending on the task requirements. For instance, two vehicles may have coordinated movement while a third vehicle (or multiple other vehicles) is/are not moved in a coordinated manner until needed or required to accomplish a task (e.g., oilier vehicle (s) can be on stand-by until paired or controlled with other vehicle(s)). In some examples, three or more robotic vehicles discussed herein can operate in the follow-me mode further described herein, such that two or more robotic vehicles follow a "leader" robotic vehicle using the same or similar functionality described herein regarding such mode.

In one example, the control module 220 (see FIG. 7) can further include a follow-me module 223, which effectuates operation of the follow-me mode discussed herein. Thus, the follow-me module 223 of the control module 220 can comprise software that facilitates activation and implementation of a follow-me mode, and can be operable in the follow-me mode to actively control the first robotic system (e.g., 104a) while passively controlling the second robotic system (e.g., 104b) and the one or more stabilizing robotic vehicles (not shown) based on at least one force output signal when the first and second manipulators (e.g., 116a and 116b) are supporting and moving a common payload. More specifically, and using FIG. 4 (or FIG. 5) as an example where the first and second robotic systems 104a and 104b are lifting and supporting a common payload, the user can select the follow-me mode for active control over the first robotic system 104a, specifically control over the ground movement via the first mobile platform 108a, and control over the first manipulator 116a, via input devices (FIG. 2). As noted above regarding the description of FIG. 6, the first manipulator 116a can include or support one or more sensors, such as force sensors associated with each joint of the manipulator 116a (e.g., joints associated with shoulder, elbow, wrist, gripper, platform rotation). The force or load sensors can also be used to enable gravity compensation of the manipulator 116b (and 116a), for instance. In addition, the force or load sensors can be used to measure a force applied by a payload (from movement of the first robotic system) to the second manipulator to enable enhanced operation of the second manipulator, such as by torque assistance. The load or force sensors can include any type of suitable load sensor including, but not limited to, a strain gauge, a thin film sensor, a piezoelectric sensor, a resistive load sensor, and the like. For example, load sensors that may be used include load cells produced by Sensotec, P/N AL311CR or P/N AL31DR-1A-2U-6E-15C, Futek, P/N LCM375-FSSH00675, or P/N LCM325-FSH00672.

Each force sensor supported by the manipulator (e.g., 116a, 116b) is configured to generate at least one force output signal associated with a load at or applied to the respective joint of the second manipulator 116b, for instance. The force output signal(s) may be transmitted to CPU(s) on the second robotic system and/or on the master robotic system for processing. One purpose behind the follow-me mode is to prevent damage to the robotic systems, the payload, and avoid tipping of the first and second mobile platforms, all of which are risks when actively controlling both the first and second robotic systems because of the uncertainty of such control when moving a payload that may have continuously changing center of gravity during movement. Accordingly, the first robotic system 104*a*, for instance, can be actively controlled to move about the ground and move the payload (via its manipulator), while the second robotic system 104*b* passively follows movement of the first robotic system 104*a*, as experienced by loads transferred through the payload to the second manipulator 116*b*, which are sensed by the one or more force sensors associated with the second manipulator 116*b*. Therefore, the first robotic system 104*a* is effectively "pulling along" the second robotic system 104*b*. For instance, if a load sensor on the second manipulator 116*b* senses a load (from the payload being moved by the first robotic system 104*a*) that is "too large", and therefore potentially unsafe or undesirable for effective transportation of the payload, CPU(s) (of the master control system or of the second robotic system) can command the second robotic system 104*b* to automatically take one or more actions, such as effectuating movement of the tracks 112*c* and 112*d* and/or movement of one or more joints of the second manipulator 116*b*, for instance. Thus, various force thresholds can be determined and programmed, these being executable by the CPU(s), so that if one or more joints is experiencing a load that is nearing or is beyond a particular torque threshold a torque threshold of 40 Nm), the second robotic system 104*b* will automatically adjust its ground position and/or manipulator position accordingly to prevent the second mobile platform 110*b* from tipping over, for instance. Thus, the second robotic system 104*b* can be operated by the control module in a follow-me mode, so that the second robotic system 104*b* follows movement corresponding to movement of the first robotic system 104*a* as translated through forces translated through the common payload supported by both manipulators 116*a* and 116*b*.

In one example, one or more position sensors can be supported by the second manipulator 116*b*, and associated with the joints of the manipulator 116*b* for similar purposes as the force sensors while in the follow-me mode. For instance, if a position sensor associated with a joint near the second mobile platform 110*b* (e.g., a shoulder or torso joint) senses that the angular position of the particular joint is beyond (or reaching) a joint position threshold (e.g., beyond 145 degrees from a nominal position), such that the second manipulator 116*a* is being extend outwardly "too far" than acceptable (and therefore risking tipping over of the first and/or second mobile platform), the CPU(s) can transmit a command signal to the second robotic system 104*b* to move its tracks in a direction toward the vector of the pulling force from the payload (via movement of the first robotic system), for instance. Then, the second robotic system 104*b* can be controlled to actuate one or more joints to reduce the joint position to an acceptable position or degree (e.g., 90 degrees) under the joint position threshold, so that the second robotic system 104*b* can be moved (i.e., its tracks and/or manipulator) to prevent potentially unsafe or undesirable movements of the first and/or second robotic systems 104*a*, and 104*b*, and even that of the payload. Thus, the load sensors and position sensors associated with the second manipulator 116*b* can transmit output signals that, when viewed or combined together, the CPU(s) of the master control system can determine if one or more joints is (or will) experience an unsafe load at an unsafe position, and therefore the CPU(s) can automatically command the second robotic system to take appropriate actions, and therefore "follow" the first robotic system via movement and force transferred through the common payload supported by both manipulators.

Note that the user may actively select the follow-me mode via an input device after the first and second robotic systems have grasped and lifted the common payload. In this case, the first and second robotic systems would be operating in the unpaired control mode, in which the user has selected active control over only the first robotic system. At a later time after the follow-me mode tasks have been achieved (i.e., the payload is in a desired position held by both manipulators), the user can switch to the paired control mode (for ground movement and/or manipulator movement) to perform another task, such as unloading the payload from the grasp of both manipulators by actively controlling both manipulators.

In one example, the second manipulator 116*b* can be somewhat flexible or compliant while in the follow-me mode to prevent damage to the robots, the payload, or individuals. More specifically, one or more joints of the second manipulator 116*b* can be programmed to actuate (whether powered or unpowered) to a certain degree as the payload is being moved, such as within 5 to 10% of joint displacement (as long as that does not exceed the aforementioned force threshold, based on the sensed loads at the second manipulator 116*b*. In this way, each joint of the second manipulator 116*b* can "bounce" or "spring" clockwise or counterclockwise so that it is somewhat flexible, and not rigidly constrained, which may be useful when the payload is lifted, rotated, off-balanced, etc. by the first robotic system.

Accordingly, the follow-me module 223 can include a combination of software and mechanical devices for facilitating operation of the first and second robotic systems 104*a* and 104*b* in the aforementioned follow-me mode, such as software processed by the CPU(s) of the master robotic system 102 (FIG. 5), software processed by the CPUs of the first and second robotic systems 104*a* and 104*b* (FIG. 6), the drive input device(s) (FIG. 2), the mobility input(s) 212 (FIG. 5), master control manipulators 204*a* and 204*b* (FIG. 2), master control manipulator inputs 214*a* and 214*b* (FIG. 5), and various aspects of the first and second robotic systems 104*a* and 104*h* (FIG. 6) (i.e., computers, mobility mechanisms, manipulators, force and position sensors).

Figure 18:
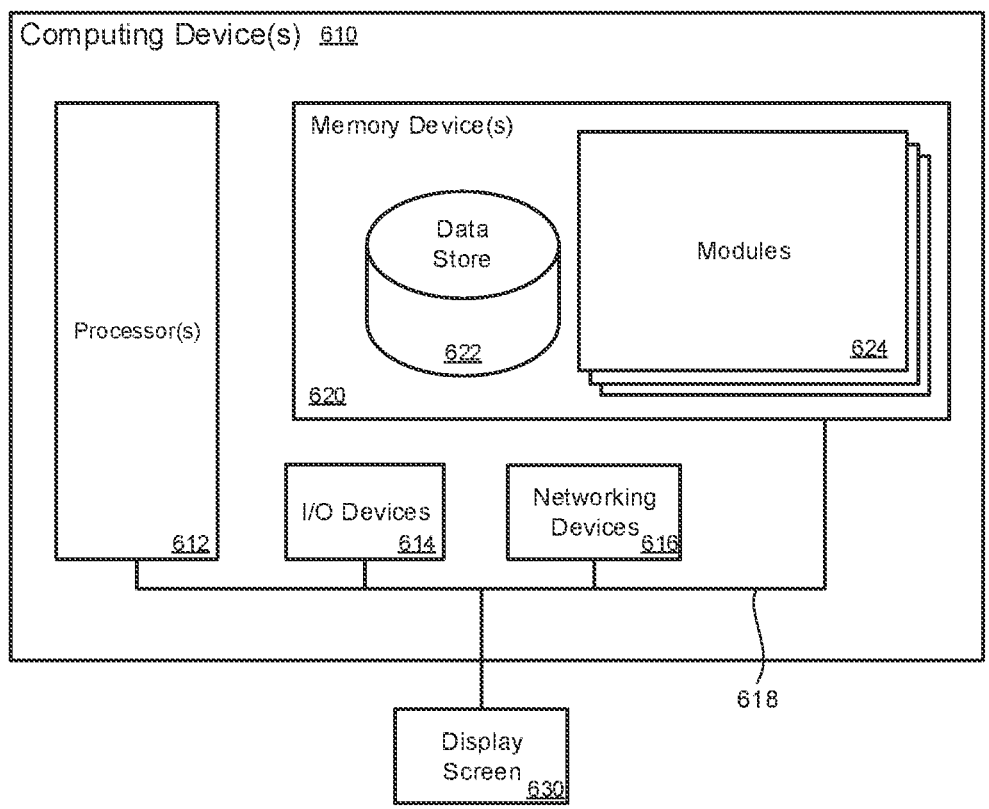
FIG. 18 is block diagram illustrating an example of a computing device that may be used to execute a method for operating a pair of vehicles, such as first and second robotic systems of the present disclosure, in accordance with one exemplary embodiment.

FIG. 18 illustrates a computing device 610 on which software components of the modules of this technology may execute. A computing device 610 is illustrated on which a high-level example of the technology may be executed. The computing device 610 may include one or more processors 612 that are in communication with memory devices 620. The computing device 610 may include a local communication interface 618 for the components in the computing device. For example, the local communication interface 618 may be a local data bus and/or any related address or control busses as may be desired.

The memory device 620 may contain software modules 624 that are executable by the processor(s) 612 and data for the modules 624. For example, the memory device 620 may include respective software components that are part of a follow-me module 223, robot control switch module 222, drive control module 224, manipulator control module 226, and the unified control module 228. The software modules 624 may execute the functions described earlier. A data store 622 may also be located in the memory device 620 for storing data related to the software modules 624 and other applications along with an operating system that is executable by the processor(s) 612.

Other applications may also be stored in the memory device 620 and may be executable by the processor(s) 612. Components or modules discussed in this description that may be implemented in the form of software using high-level programming languages that are compiled, interpreted or executed using a hybrid of the methods.

The computing device may also have access to I/O (input/output) devices 614 that are usable by the computing devices. An example of an I/O device 614 is a display screen 630 that is available to display output from the computing device 610. Another example of an FO device 614 is one or more drive and manipulator control input devices, switch input devices, and other I/O devices associated with a master control system of the present disclosure. Networking devices 616 and similar communication devices may be included in the computing device. The networking devices 616 may be wired or wireless networking devices that connect to the interact, a LAN, WAN, or other computing network.

The components or modules that are shown as being stored in the memory device 620 may be executed by the processor(s) 612. The term "executable" may mean a program file that is in a form that may be executed by a processor 612. For example, a program in a higher level language may be compiled into machine code in a format that may be loaded into a random access portion of the memory device 620 and executed by the processor 612, or source code may be loaded by another executable program and interpreted to generate instructions in a random access portion of the memory to be executed by a processor. The executable program may be stored in any portion or component of the memory device 620. For example, the memory device 620 may be random access memory (RAM), read only memory (ROM), flash memory, a solid state drive, memory card, a hard drive, optical disk, floppy disk, magnetic tape, or any other memory components.

The processor 612 may represent multiple processors and the memory device 620 may represent multiple memory units that operate in parallel to the processing circuits. This may provide parallel processing channels for the processes and data in the system. The local communication interface 618 may be used as a network to facilitate communication between any of the multiple processors and multiple memories. The local communication interface 618 may use additional systems designed for coordinating communication such as load balancing, bulk data transfer and similar systems.

Figure 19:
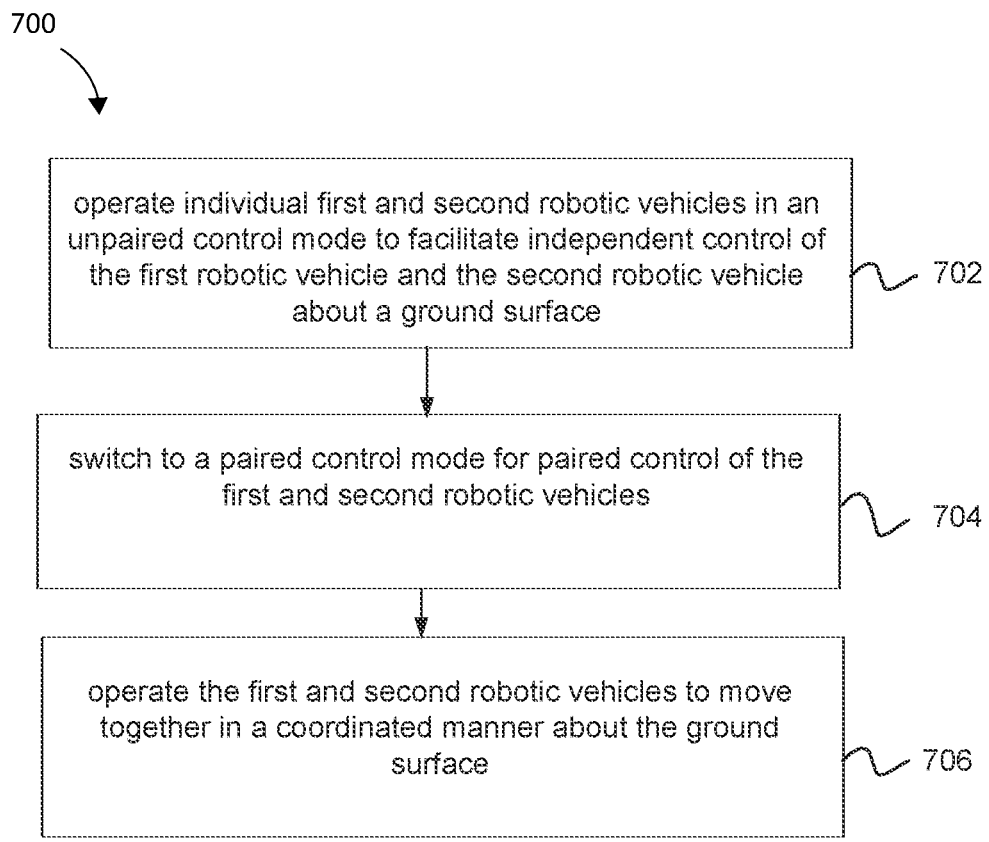
FIG. 19 is a flow diagram illustrating a method of operating a plurality of robotic vehicles, in accordance with on exemplary embodiment.

FIG. 19 is a flow diagram illustrating a method 700 of operating a plurality of robotic vehicles, in accordance with on exemplary embodiment. As in block 702, the method can comprise operating individual first and second robotic vehicles in an unpaired control mode to facilitate independent control of the first robotic vehicle and the second robotic vehicle about aground surface (e.g., see description above regarding FIGS. 1-9). As in block 704, the method can comprise switching to a paired control mode for paired control of the first and second robotic vehicles see description above regarding FIGS. 1-14). As in block 706, the method can comprise operating the first and second robotic vehicles to move together in a coordinated manner about the ground surface (e.g., see description above regarding FIGS. 1-14).

Figure 20:
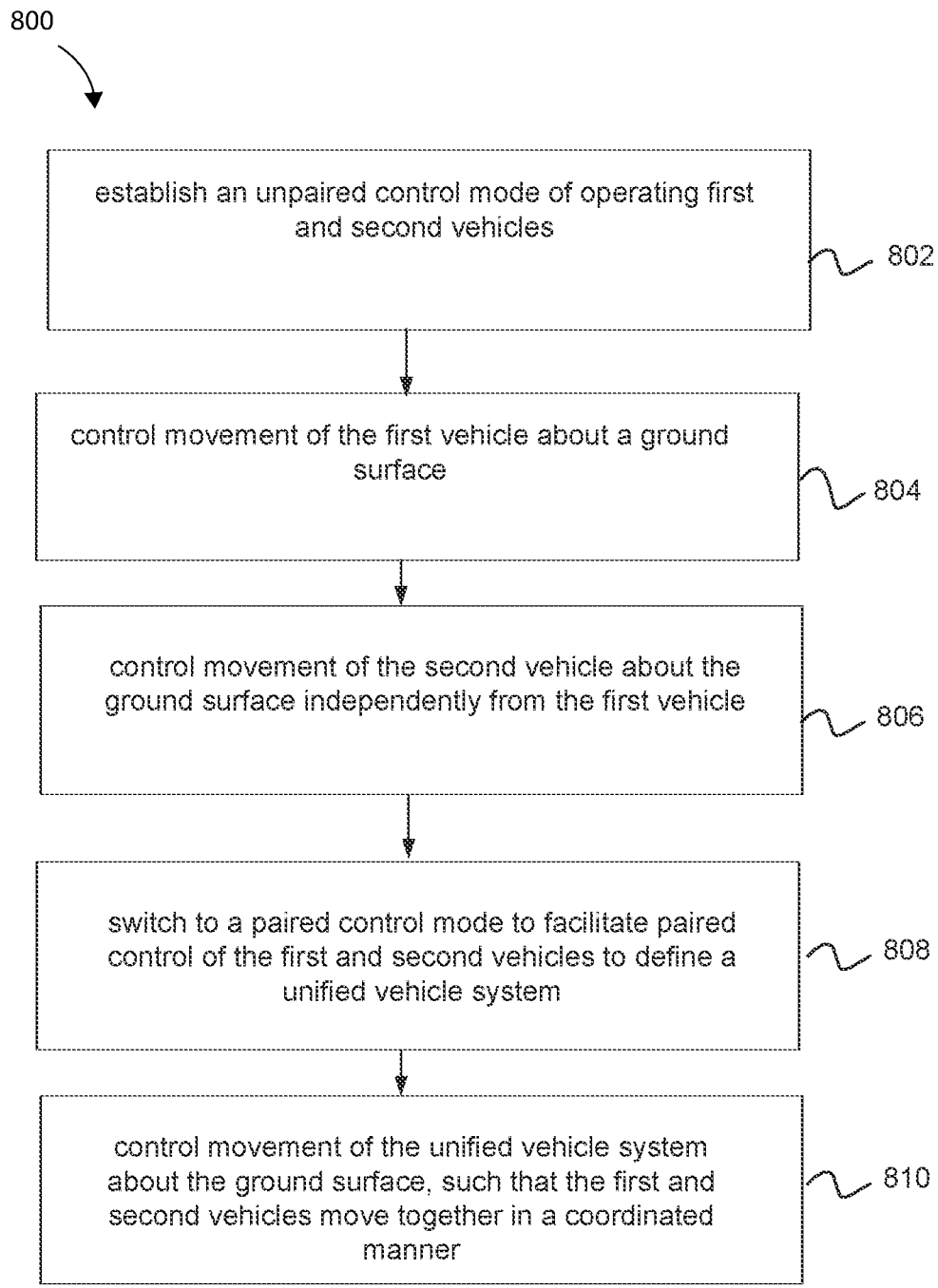
FIG. 20 is a flow diagram illustrating a method of operating a plurality of robotic vehicles, in accordance with on exemplary embodiment.

FIG. 20 is a flow diagram illustrating a method 800 of operating a plurality of robotic vehicles, in accordance with on exemplary embodiment. The method 800 can be effectuated by one or more non-transitory computer readable storage medium storing instructions that, when executed by one or more processors, cause the one or more processors to perform one or more operations, as follows. As in block 802, the method can comprise causing the processor(s) to establish an unpaired control mode of operating first and second vehicles. As in block 804, the method can comprise causing the processor(s) to control movement of the first vehicle about a ground surface. As in block 806, the method can comprise causing the processor(s) to control movement of the second vehicle about the ground surface independently from the first vehicle. As in block 808, the method can comprise causing the processor(s) to switch to a paired control mode to facilitate paired control of the first and second vehicles to define a unified vehicle system. As in block 810, the method can comprise causing the processor (s) to control movement of the unified vehicle system about the ground surface, such that the first and second vehicles move together in a coordinated manner. It should be appreciated that the operations of method 800 can be effectuated by the various examples discussed herein, particularly regarding the descriptions of the examples regarding FIGS. 1-14, and elsewhere.

Some of the functional units described in this specification have been labeled as modules, in order to more particularly emphasize their implementation independence. For example, a module may comprise at least some of the mechanical and structural devices and/or systems of the robot or robotic systems, as well as a software component or software module. Modules can further comprise, in part, a hardware circuit comprising custom VLSI circuits or gate arrays, off-the-shelf semiconductors such as logic chips, transistors, or other discrete components. A module may also be implemented in or comprise programmable hardware devices such as field programmable gate arrays, programmable array logic, programmable logic devices or the like.

Modules may also be implemented in or comprise a software component or software module for execution by various types of processors. An identified software module of executable code may, for instance, comprise one or more blocks of computer instructions, which may be organized as an object, procedure, or function. Nevertheless, the executables of an identified software module need not be physically located together, but may comprise disparate instructions stored in different locations which comprise the software module and achieve the stated purpose for the software module when joined logically together.

Indeed, a software module of executable code may be a single instruction, or many instructions and may even be distributed over several different code segments, among different programs and across several memory devices. Similarly, operational data may be identified and illustrated herein within software modules and may be embodied in any suitable form and organized within any suitable type of data structure. The operational data may be collected as a single data set, or may be distributed over different locations including over different storage devices. The software modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A robotic system, comprising:
a master robotic system comprising a drive input device;
a first robotic system comprising a first mobile platform operable to move within an environment;
a second robotic system comprising a second mobile platform operable to move within the environment;
one or more processors; and
one or more memory devices operatively coupled to at least one of the one or more processors and having instructions stored thereon that, when executed by at least one of the one or more processors, cause the system to:
operate in a paired control mode to facilitate paired control of the first and second robotic systems that together define a unified robotic system operable to move within the environment via control of the master robotic system;
wherein the first mobile platform comprises a first mobility mechanism and the second mobile platform comprises a second mobility mechanism, wherein, when in a paired drive control mode of the paired control mode, the drive input device of the master robotic system is operable to jointly control both the first mobility mechanism and the second mobility mechanism.

2. The system of claim 1, wherein the first and second mobile platforms of the first and second robotic systems, respectively, each comprise a mobility mechanism, and wherein the one or more memory devices further comprising instructions stored thereon that, when executed by at least one of the one or more processors, cause the system to operate in a paired drive control mode of the paired control mode that facilitates operation of the mobility mechanisms of the first and second mobile platforms to facilitate movement of the unified robotic system.

3. The system of claim 2, wherein the one or more memory devices further comprises instructions stored thereon that, when executed by at least one of the one or more processors, cause the system to operate in the paired drive control mode to facilitate movement of the unified robotic system as if the first and second mobile platforms are movable as a single, unitary mobile platform.

4. The system of claim 1, wherein the one or more memory devices further comprises instructions stored thereon that, when executed by at least one of the one or more processors, cause the system to operate in a paired control drive mode to facilitate paired control of the first and second mobile platforms.

5. The system of claim 1, wherein the one or more memory devices further comprises instructions stored thereon that, when executed by at least one of the one or more processors, cause the system to operate in an unpaired control mode to facilitate unpaired control of a selected one of the first or second mobile platforms via control of the drive input device, and the one or more memory devices further comprising instructions stored thereon that, when executed by at least one of the one or more processors, cause the system to switch between the paired control mode and the unpaired control mode via operation of a switch input device of the master robotic system.

6. The system of claim 5, wherein the one or more memory devices further comprises instructions stored thereon that, when executed by at least one of the one or more processors, cause the system to operate in an autonomous pairing mode that facilitates the first and second mobile platforms autonomously moving to a paired position relative to each other based on position data generated by a position sensor on each of the first and second robotic systems.

7. The system of claim 1, wherein the first robotic system comprises a first manipulator supported by the first mobile platform, and wherein the second robotic system comprises a second manipulator supported by the second mobile platform, the one or more memory devices further comprising instructions stored thereon that, when executed by at least one of the one or more processors, cause the system to operate in a paired manipulator control mode that facilitates paired control of the first and second manipulators via operating respective first and second control manipulator input devices of the master robotic system.

8. The system of claim 7, wherein the first and second manipulators are each equipped with an end effector operable in the paired manipulator control mode that facilitates paired control of the end effectors.

9. The system of claim 1, wherein the at least one drive input device comprises a first drive input device and the system further comprises a second drive input device, wherein, when in the paired control mode, the first and second drive input devices are operable by a user to control movement of the unified robotic system, and wherein, when in the unpaired mode, one of the first or second drive input devices is operable by the user to control movement of a selected one of the first or second robotic systems.

10. The system of claim 9, wherein the first and second drive input devices facilitate user control of movement of the first and second mobile platforms remotely located from each other and when operated in the paired control mode.

11. The system of claim 1, wherein the first mobile platform comprises a first coupling mechanism, and wherein the second mobile platform comprises a second coupling mechanism, wherein, when in a paired drive control mode of the paired control mode, the first and second coupling mechanisms are operable to physically couple together the first and second mobile platforms in a side-by-side configuration.

12. The system of claim 1, wherein the master control system comprises an exoskeleton structure comprising first and second master control manipulators associated with respective first and second manipulators of the respective first and second robotic systems for control thereof.

13. The system of claim 1, wherein the master control system comprises one of an exoskeleton-based master control system, a replica-based master control system, an accelerometer-based master control system, a brake-based master control system, or an end point control-based master control system.

14. The system of claim 1, wherein the master robotic system comprises at least one switch input device operable by a user to switch between the paired control mode and an unpaired control mode, the one or more memory devices further comprising instructions stored thereon that, when executed by at least one of the one or more processors, cause the system to operate in the unpaired control mode to facilitate independent control of at least one function of the first and second robotic systems.

15. The system of claim 1, wherein each of the first and second robotic systems comprises at least one position location sensor, the one or more processors configured to receive position and orientation data associated with the position location sensors to determine a distance between and relative orientation of the first and second mobile platforms, and the one or more memory devices further comprising instructions stored thereon that, when executed by at least one of the one or more processors, cause the system to operate in a paired drive control mode to control respective movements of the first and second mobile platforms in a coordinated manner based on the determined distance between and relative orientation of the first and second mobile platforms.

16. The system of claim 1, wherein the second robotic system comprises a second manipulator supported by the second mobile platform, and a force sensor associated with a joint of the second manipulator, the one or more memory devices further comprising instructions stored thereon that, when executed by at least one of the one or more processors, cause the system to operate in a follow-me mode that actively controls the first robotic system while passively controlling the second robotic system based on a force output signal provided by the force sensor when end effectors of the first and second manipulators are supporting and moving a common payload, such that the second robotic system follows movement of the first robotic system.

17. The system of claim 1, wherein the one or more memory devices further comprises instructions stored thereon that, when executed by at least one of the one or more processors, cause the system to operate in an autonomous mode, a semi-autonomous mode, or a supervised autonomous mode for control of at least one function of at least one of the first or second mobile platforms.

18. A robotic vehicle control system, comprising:
a first robotic vehicle having a mobility mechanism for moving about an environment;
a second robotic vehicle having a mobility mechanism for moving about the environment; and
one or more processors;
one or more memory devices operatively coupled to at least one of the one or more processors and having instructions stored thereon that, when executed by at least one of the one or more processors, cause the system to:
operate in a paired control mode to facilitate paired control of the first and second robotic vehicles so as to define a unified robotic vehicle system operable to move about the environment under user control, and
switch to an unpaired control mode to facilitate independent movement of at least one of the first or second robotic systems relative to each other,
wherein the first robotic vehicle and the second robotic vehicle are configured to operate in the paired control mode while being separated by a distance and physically unconnected from each other.

19. The robotic vehicle control system of claim 18, wherein the one or more memory devices further comprises instructions stored thereon that, when executed by at least one of the one or more processors, cause the system to operate in a paired drive control mode to facilitate coordinated control of the mobility mechanisms of the first and second robotic vehicles.

20. The robotic vehicle control system of claim 18, wherein the one or more memory devices further comprises instructions stored thereon that, when executed by at least one of the one or more processors, cause the system to switch to an unpaired control mode to facilitate independent control of movement of the first robotic vehicle or the second robotic vehicle, and wherein the one or more memory devices further comprises instructions stored thereon that, when executed by at least one of the one or more processors, cause the system to switch between the paired control mode and the unpaired control mode.

21. The robotic vehicle control system of claim 18, wherein the one or more memory devices further comprises instructions stored thereon that, when executed by at least one of the one or more processors, cause the system to operate in a paired manipulator control mode that facilitates paired control of first and second manipulators supported on the respective first and second robotic vehicles.

22. The robotic vehicle control system of claim 21, wherein the first and second manipulators are each equipped with an end effector operable in the paired manipulator control mode that facilitates paired control of the end effectors.

23. The robotic vehicle control system of claim 18, wherein the mobility mechanisms of the first and second robotic vehicles each comprise at least one of a pair of tracks or a set of wheels.

24. The robotic vehicle control system of claim 18, wherein each of the first and second robotic vehicles comprises at least one position location sensor to generate position data and orientation data, the one or more memory devices further comprising instructions stored thereon that, when executed by at least one of the one or more processors, cause the system to determine the distance, based on the position data, between the first and second robotic vehicles, and to determine an orientation, based on the orientation data, of each of the first and second robotic vehicles relative to each other, to control respective movement of the mobility mechanisms of the first and second robotic vehicles in a coordinated manner.

25. The robotic vehicle control system of claim 18, further comprising a stabilizing robotic vehicle having a mobility mechanism for moving about the environment, and operable with at least one of the first or second robotic vehicles, wherein the one or more memory devices further comprises instructions stored thereon that, when executed by at least one of the one or more processors, cause the system to:
operate in a paired control mode to facilitate paired control of at least one of the first or second robotic vehicles and the stabilizing robotic vehicle so as to define a unified robotic vehicle system operable to move about the environment under user control, and
switch to an unpaired control mode to facilitate independent movement of at least one of the first robotic vehicle or the second robotic vehicle or the stabilizing robotic vehicle relative to one another.

26. The robotic vehicle control system of claim 18, wherein the second robotic vehicle comprises a stabilizing robotic vehicle operable with the first robotic vehicle to stabilize the first robotic vehicle.

27. A method of operating a plurality of robotic vehicles, the method comprising:
operating individual first and second robotic vehicles in an unpaired control mode to facilitate independent control of the first robotic vehicle and the second robotic vehicle about an environment; and
switching to a paired control mode for paired control of the first and second robotic vehicles; and
operating the first and second robotic vehicles to move together in a coordinated manner about the environment,
wherein the first robotic vehicle and the second robotic vehicle are configured to operate in the paired control mode while being separated by a distance and physically unconnected from each other.

28. The method of claim 27, wherein switching to the paired control mode comprises switching to a paired drive control mode, the method further comprising operating mobility mechanisms of first and second robotic vehicles to move together the first and second robotic vehicles as a single robotic vehicle.

29. The method of claim 27, further comprising operating a robotic vehicle control system to control movement of the first and second robotic vehicles.

30. The method of claim 29, further comprising operating a switch input device of the robotic vehicle control system to facilitate the switching to the paired control mode.

31. The method of claim 29, further comprising operating at least one drive input device of the robotic vehicle control system to facilitate coordinated movement of the first and second robotic vehicles.

32. The method of claim 27, further comprising:
determining the distance, with one or more processors of a robotic vehicle control system, between the first and second robotic vehicles using position data provided by respective position location sensors of the first and second robotic vehicles;
determining an orientation, with the one or more processors, of each of the first and second robotic vehicles relative to each other using orientation data provided by respective position location sensors; and
operating the first and second robotic vehicles in the paired control mode based on the determined distance and determined relative orientation for coordinated control of movement of the first and second robotic vehicles.

33. The method of claim 32, further comprising selecting a turning center point relative to the determined position and orientation of the first robotic vehicle relative to the second robotic vehicle to facilitate coordinated control of movement of the first and second robotic vehicles about the turning center point.

34. The method of claim 27, wherein the first robotic vehicle comprises a first robotic system having a first mobile platform and a first manipulator, and wherein the second robotic vehicle comprises a second robotic system having a second mobile platform and a second manipulator, the method further comprising operating a master control system for coordinated control the first and second mobile platforms and first and second manipulators.

35. One or more non-transitory computer readable storage medium storing instructions that, when executed by one or more processors, cause the one or more processors to:
establish an unpaired control mode of operating first and second vehicles;
control movement of the first vehicle about an environment;
control movement of the second vehicle about the environment independently from the first vehicle;
switch to a paired control mode to facilitate paired control of the first and second vehicles to define a unified vehicle system; and
control movement of the unified vehicle system about the environment, such that the first and second vehicles move together in a coordinated manner;
wherein the first robotic vehicle and the second robotic vehicle are configured to operate in the paired control mode while being physically unconnected from each other and separated by a distance from one another.

36. The one or more non-transitory computer readable storage media of claim 35, further comprising instructions that, when executed by the one or more processors, cause the one or more processors to switch to a paired drive control mode of the paired control mode to facilitate control of first and second mobility mechanisms of respective first and second vehicles.

37. The one or more non-transitory computer readable storage media of claim 35, further comprising instructions that, when executed by the one or more processors, cause the one or more processors to transmit command signals, associated with user movement from operating a master robotic system, to the unified vehicle system for controlling movement of the first and second vehicles in the paired control mode.

38. The one or more non-transitory computer readable storage media of claim 36, further comprising instructions that, when executed by the one or more processors, cause the one or more processors to:

determine the distance between the first and second vehicles based on position data generated from position location sensors on the respective first and second vehicles;

determine an orientation of the first and second vehicles relative to each other; and to control movement of the first and second vehicles in a coordinated manner based on the determined distance and relative orientation.

39. A robotic system, comprising:
a master robotic system;
a first robotic system comprising a first mobile platform operable to move about an environment, and comprising a first manipulator supported by the first mobile platform;
a second robotic system comprising a second mobile platform operable to move about the environment, and comprising a second manipulator supported by the second mobile platform;
at least one force sensor operably coupled to the second manipulator, the at least one force sensor configured to generate at least one force output signal associated with a load applied to the second manipulator; and
one or more processors;
one or more memory devices operatively coupled to at least one of the one or more processors and having instructions stored thereon that, when executed by at least one of the one or more processors, cause the system to:
operate in a follow-me mode to actively control the first robotic system while passively controlling the second robotic system based on the at least one force output signal when end effectors of the first and second manipulators are supporting a common payload, such that the second robotic system passively follows movement about the environment corresponding to actively controlled movement of the first robotic system via the master control system.

40. The system of claim 39, wherein the second robotic system comprises a mobility mechanism, and wherein the second manipulator comprises a plurality of joints, the second robotic system further comprising a plurality of force sensors associated with respective joints, and wherein the one or more memory devices further comprises instructions stored thereon that, when executed by at least one of the one or more processors, cause the system to transmit command signals to the second robotic system to operate at least one joint and the mobility mechanism of the second robotic system based on at least one output signal from at least one force sensor to facilitate passive movement of the second robotic system in response to controlled movement of the first robotic system.

41. The system of claim 40, wherein at least some of the joints are operable to passively move about a respective degree of freedom and to passively operate under a force threshold based on a load applied to the second manipulator from the common payload when supported by the end effectors of the first and second manipulators.

42. The system of claim 40, wherein the mobility mechanism is operable to passively move about an environment based on a load applied to the second manipulator from the common payload when supported by the first and second manipulators.

43. A robotic vehicle control system, comprising:
a first robotic vehicle having a mobility mechanism for moving within an environment, and supporting a robotic manipulator having an end effector;
a stabilizing robotic vehicle having a mobility mechanism for moving within the environment; and
one or more processors;
one or more memory devices operatively coupled to at least one of the one or more processors and having instructions stored thereon that, when executed by at least one of the one or more processors, cause the system to:
operate in a paired control mode to facilitate paired control of the first robotic vehicle and the stabilizing robotic vehicle so as to define a unified robotic vehicle system operable to move within the environment, and
switch to an unpaired control mode to facilitate independent control of movement of at least one of the first robotic vehicle or the stabilizing robotic vehicle relative to one another,
wherein the first robotic vehicle and the stabilizing vehicle are operable in the paired control mode while being physically unconnected from each other and separated by a distance from one another.

44. The robotic vehicle control system of claim 43, further comprising a second robotic vehicle having a mobility mechanism for moving within the environment, wherein the second robotic vehicle is operable with the first robotic vehicle and the stabilizing robotic vehicle so as to further define the unified robotic vehicle for coordinated control of ground movement of the first and second robotic vehicles and the stabilizing robotic vehicle.

45. The robotic vehicle control system of claim 43, wherein the first robotic vehicle and the stabilizing vehicle are operable in the paired control mode while being attached together via a side-by-side coupling mechanism.

46. The robotic system of claim 7, wherein the system is operable to operate in the paired manipulator control mode while operating in an unpaired control mode to facilitate independent control of the first and second robotic systems to move within the environment via control of the master robotic system.

47. A robotic system, comprising:
a master robotic system comprising a first control manipulator and a second control manipulator;
a first robotic system comprising a first mobile platform operable to move within an environment, the first mobile platform comprising a first robotic manipulator kinematically equivalent to the first control manipulator;
a second robotic system comprising a second mobile platform operable to move within the environment, the second mobile platform comprising a second robotic manipulator kinematically equivalent to the second control manipulator;
one or more processors; and
one or more memory devices operatively coupled to at least one of the one or more processors and having instructions stored thereon that, when executed by at least one of the one or more processors, cause the system to:
operate in a paired control mode to facilitate paired control of the first and second robotic systems that together define a unified robotic system operable to move within the environment via control of the master robotic system and to facilitate control of the first robotic manipulator based on input to the first control manipulator and second robotic manipulator based on input to the second control manipulator;
wherein the first robotic vehicle and the second robotic vehicle are configured to operate in the paired control mode while physically unconnected from each other and separated by a distance from one another.

48. The robotic system of claim 47, wherein the master robotic system comprises an upper body exoskeleton, the first control manipulator being kinematically equivalent to a user's first arm from a shoulder to a wrist, and the second control manipulator being kinematically equivalent to a user's second arm from a shoulder to a wrist.

49. The robotic system of claim 47, wherein the instructions stored on the one or more memory devices, when executed by at least one of the one or more processors, further cause the system to operate in the paired control mode, wherein the kinematic equivalency between the first control manipulator and first robotic manipulator, and the kinematic equivalency between the second control manipulator and the second robotic manipulator is maintained.

* * * * *